United States Patent
Kobayashi et al.

(10) Patent No.: US 12,506,314 B2
(45) Date of Patent: Dec. 23, 2025

(54) LASER OSCILLATOR, LASER PROCESSING MACHINE, AND METHOD OF SUPPRESSING STIMULATED RAMAN SCATTERING

(71) Applicant: AMADA CO., LTD., Kanagawa (JP)

(72) Inventors: Tetsuya Kobayashi, Kanagawa (JP); Yosuke Arimoto, Kanagawa (JP); Kazuya Makiguchi, Kanagawa (JP); Hiroki Kishimoto, Kanagawa (JP); Shinnosuke Mukai, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 513 days.

(21) Appl. No.: 18/016,569

(22) PCT Filed: Jul. 30, 2021

(86) PCT No.: PCT/JP2021/028453
§ 371 (c)(1),
(2) Date: Jan. 17, 2023

(87) PCT Pub. No.: WO2022/030408
PCT Pub. Date: Feb. 10, 2022

(65) Prior Publication Data
US 2023/0283034 A1    Sep. 7, 2023

(30) Foreign Application Priority Data

Aug. 7, 2020 (JP) .................................. 2020-134769
Oct. 2, 2020 (JP) .................................. 2020-167465

(51) Int. Cl.
*H01S 3/30* (2006.01)
*H01S 3/00* (2006.01)
(Continued)

(52) U.S. Cl.
CPC .......... *H01S 3/005* (2013.01); *H01S 3/10015* (2013.01); *H01S 3/10038* (2013.01);
(Continued)

(58) Field of Classification Search
CPC .. H01S 3/005; H01S 3/10015; H01S 3/10038; H01S 3/1086; H01S 3/1024;
(Continued)

(56) References Cited

U.S. PATENT DOCUMENTS

| | | | |
|---|---|---|---|
| 5,390,204 A * | 2/1995 | Yessik | H01S 3/092 372/38.03 |
| 2010/0135347 A1* | 6/2010 | Deladurantaye | H01S 3/06754 372/30 |

(Continued)

FOREIGN PATENT DOCUMENTS

| | | |
|---|---|---|
| JP | 2019-197081 | 11/2019 |
| JP | 2020-61512 | 4/2020 |

OTHER PUBLICATIONS

Written Opinion of the International Searching Authority for International Patent Application No. PCT/JP2021/028453, dated Sep. 21, 2021, along with an English translation thereof.
(Continued)

*Primary Examiner* — Kinam Park
(74) *Attorney, Agent, or Firm* — Greenblum & Bernstein, P.L.C.

(57) ABSTRACT

A pulse generation unit generates a driving voltage signal including a pulse signal. A laser oscillation module oscillates a laser beam by carrying out, based on the driving voltage signal, a pulse oscillating operation. When the power command signal has a voltage command value corresponding to a laser power greater than a predetermined laser power during a high period, the pulse generation unit modulates, in a pulsed manner, a voltage value of the high period of the (Continued)

driving voltage signal so as to alternately repeat, for a preset period of time from a rising time of the high period of the driving voltage signal, a high state in which the voltage value is maintained and a low state in which the voltage value is lowered by a predetermined voltage value without being lowered to a voltage value of a low period of the driving voltage signal.

5 Claims, 27 Drawing Sheets

(51) Int. Cl.
　　*H01S 3/10* (2006.01)
　　*H01S 3/108* (2006.01)
　　*B23K 26/00* (2014.01)
　　*B23K 26/0622* (2014.01)

(52) U.S. Cl.
　　CPC ............ *H01S 3/1086* (2013.01); *B23K 26/00* (2013.01); *B23K 26/0622* (2015.10)

(58) Field of Classification Search
　　CPC ............ H01S 3/0675; H01S 3/094076; H01S 3/09415; H01S 3/10046; H01S 3/10069; H01S 3/1312; H01S 3/1618; H01S 2301/03; B23K 26/00; B23K 26/0622; B23K 26/38

See application file for complete search history.

(56) References Cited

U.S. PATENT DOCUMENTS

| | | | |
|---|---|---|---|
| 2011/0019705 A1* | 1/2011 | Adams | H01S 3/13013 |
| | | | 359/341.1 |
| 2017/0271835 A1* | 9/2017 | Fukui | H01S 3/06758 |
| 2019/0341738 A1 | 11/2019 | Takazane | |
| 2020/0119515 A1 | 4/2020 | Suzuki | |

OTHER PUBLICATIONS

International Search Report Issued in International Patent Application No. PCT/JP2021/028453, dated Sep. 21, 2021, along with an English translation thereof.

Extended European Search Report issued in Corresponding EP Patent Application No. 21852343.9, dated Jan. 5, 2024.

* cited by examiner

LASER OSCILLATOR, LASER PROCESSING MACHINE, AND METHOD OF SUPPRESSING STIMULATED RAMAN SCATTERING

TECHNICAL FIELD

The present disclosure relates to a laser oscillator, a laser processing machine, and a method of suppressing stimulated Raman scattering.

BACKGROUND ART

With increased brightness and power of a laser oscillator installed in a laser processing machine in recent years, a laser processing machine equipped with a laser oscillator having a laser power of 10 kW or more has been brought to the market. In order to cut a thin sheet metal by a laser processing machine at a high velocity, it is necessary to irradiate the sheet metal with a laser beam having high brightness and a good beam condensing property. For this reason, a core diameter of an optical fiber provided to the laser oscillator is generally reduced.

When the power of the laser oscillator becomes higher, stimulated Raman scattering, which is one of the non-linear phenomena of the optical fiber, is likely to be generated. Hereinafter, the stimulated Raman scattering may be abbreviated as the SRS. Further, when the core diameter of the optical fiber is reduced, the SRS is likely to be generated. SRS generation threshold $Psrs\_th$, which is a threshold of a laser power at which the SRS is generated, is calculated by the equation (1), wherein an effective core cross-sectional area of the optical fiber is Aeff, a polarization factor that is a constant number is fp, a Raman gain that is a constant number is Gr, and an effective fiber length of the optical fiber is Leff.

$$Psrs\_th = 16 \times (Aeff/(fp \times Gr \times Leff)) \quad (1)$$

As can be seen from the equation (1), if the core diameter of the optical fiber is small, the SRS generation threshold $Psrs\_th$ becomes small and the SRS is likely to be generated. When the core diameter is increased, the beam quality of the laser beam deteriorates and the processing quality of the thin plate is lowered. Therefore, it is not possible to increase the core diameter. If the effective fiber length Leff of the optical fiber is shortened, the SRS generation threshold $Psrs\_th$ becomes large. However, since a feeding fiber provided to the laser oscillator has a length of 10 m to 20 m, it is difficult to shorten the effective fiber length Leff.

CITATION LIST

Patent Literature

Patent Literature 1: Japanese Patent Application Laid-Open Publication No. 2019-197081
Patent Literature 2: Japanese Patent Application Laid-Open Publication No. 2020-61512

SUMMARY

When a large amount of the SRS is generated in the laser oscillator, the power of the laser beam emitted from the laser oscillator becomes unstable and the beam quality deteriorates. Then, the processing velocity or processing quality in cutting the sheet metal is lowered. The laser oscillator oscillates the laser beam by carrying out either a continuous wave (CW) oscillating operation or a pulse oscillating operation. The SRS is hardly generated when the laser oscillator carries out the CW oscillating operation, but a large amount of the SRS is generated when the laser oscillator carries out the pulse oscillating operation. It is required to suppress the SRS generated when the laser oscillator carries out the pulse oscillating operation to oscillate the laser beam.

An object of one or more embodiments is to provide a laser oscillator, a laser processing machine, and a method of suppressing stimulated Raman scattering capable of effectively suppressing stimulated Raman scattering that is generated when the laser oscillator carries out a pulse oscillating operation to oscillate a laser beam.

According to a first aspect of the one or more embodiments, there is provided a laser oscillator that includes a pulse generation unit configured to generate, based on a power command signal, a driving voltage signal, the driving voltage signal comprising a pulse signal that alternately repeats high and low, the power command signal comprising a pulse signal that alternately repeats high and low, and a laser oscillation module configured to oscillate a laser beam by carrying out, based on the driving voltage signal, a pulse oscillating operation, in which the pulse generation unit is configured to superimpose a sub pulse on the driving voltage signal, when the power command signal has a voltage command value corresponding to a laser power greater than a predetermined laser power during a high period, by modulating, in a pulsed manner, a voltage value of a high period of the driving voltage signal so as to alternately repeat a high state and a low state for a preset period of time from a rising time of the high period of the driving voltage signal, the voltage value being maintained in the high state, the voltage value being lowered by a predetermined voltage value in the low state without being lowered to a voltage value of a low period of the driving voltage signal, and not to superimpose the sub pulse on the driving voltage signal, when the power command signal has a voltage command value corresponding to a laser power equal to or less than the predetermined laser power during the high period, without modulating, in a pulsed manner, the voltage value of the high period of the driving voltage signal.

According to a second aspect of the one or more embodiments, there is provided a laser processing machine that includes a control device configured to generate a power command signal comprising a pulse signal that alternately repeats high and low, a laser oscillator configured to oscillate a laser beam by carrying out, based on the power command signal, a pulse oscillating operation, and to emit the laser beam, and a processing unit configured to process a sheet metal by using the laser beam emitted by the laser oscillator, in which the laser oscillator includes a pulse generation unit configured to generate, based on the power command signal, a driving voltage signal comprising a pulse signal that alternately repeats high and low, and a laser oscillation module configured to oscillate the laser beam by carrying out, based on the driving voltage signal, the pulse oscillating operation, and the pulse generation unit is configured to superimpose a sub pulse on the driving voltage signal, when the power command signal has a voltage command value corresponding to a laser power greater than a predetermined laser power during a high period, by modulating, in a pulsed manner, a voltage value of a high period of the driving voltage signal so as to alternately repeat a high state and a low state for a preset period of time from a rising time of the high period of the driving voltage signal, the voltage value being maintained in the high state, the voltage value being lowered by a predetermined voltage value in the low state without being lowered to a voltage value of a low period of the driving voltage signal, and not to superimpose the sub pulse on the driving voltage signal, when the power command signal has a voltage command value corresponding to a laser power equal to or less than the predetermined laser power during the high period, without modulating, in a pulsed manner, the voltage value of the high period of the driving voltage signal.

According to a third aspect of the one or more embodiments, there is provided a method of suppressing stimulated Raman scattering that includes generating, by a control device, a power command signal to cause a laser oscillator to emit a laser beam and setting a voltage command value of a high period in accordance with a laser power of the laser beam emitted by the laser oscillator, the power command signal comprising a pulse signal that alternately repeats high and low, generating, by a pulse generation unit provided to the laser oscillator and based on the power command signal supplied from the control device, a driving voltage signal comprising a pulse signal that alternately repeats high and low, oscillating, by a laser oscillation module provided to the laser oscillator, the laser beam by carrying out, based on the driving voltage signal, a pulse oscillating operation, and superimposing a sub pulse on the driving voltage signal, when the power command signal has a voltage command value corresponding to a laser power at which the stimulated Raman scattering is generated during a high period, by modulating, in a pulsed manner, a voltage value of a high period of the driving voltage signal generated by the pulse generation unit so as to alternately repeat a high state and a low state for a preset period of time from a rising time of the high period of the driving voltage signal, the voltage value being maintained in the high state, the voltage value being lowered in the low state to a voltage value corresponding to a voltage command value corresponding to a laser power at which the stimulated Raman scattering is not generated.

According to the laser oscillator, the laser processing machine, and the method of suppressing stimulated Raman scattering of the one or more embodiments, it is possible to effectively suppress the stimulated Raman scattering generated when the laser oscillator carries out the pulse oscillating operation so as to oscillate the laser beam.

DESCRIPTION OF EMBODIMENTS

Hereinafter, a laser oscillator, a laser processing machine, and a method of suppressing stimulated Raman scattering of first to seventeenth embodiments will be described with reference to the attached drawings.

First Embodiment

Figure 1:
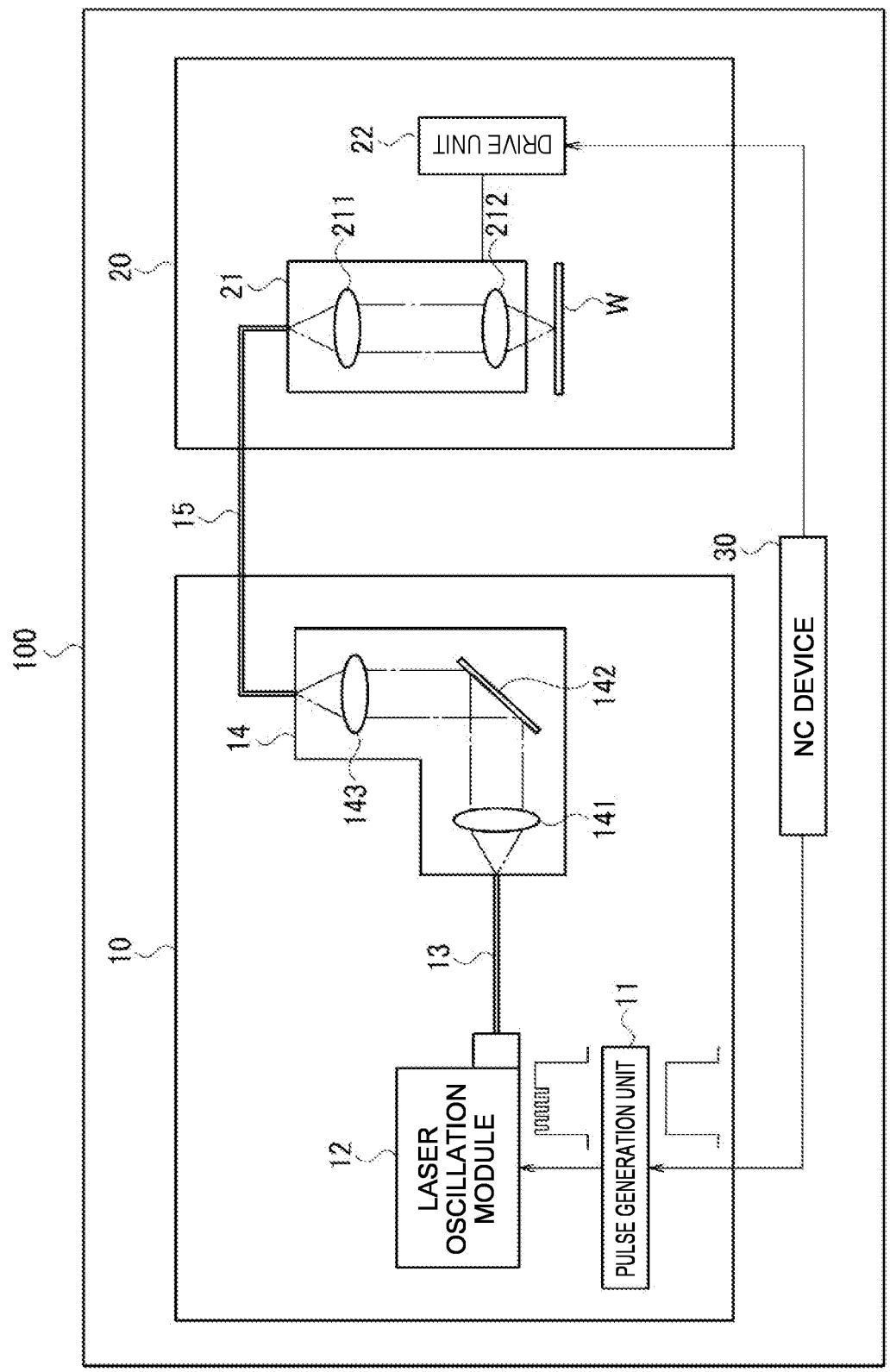
FIG. 1 is a configuration diagram showing a laser processing machine of a first embodiment including a laser oscillator of the first embodiment.

FIG. 1 shows a laser processing machine 100 of a first embodiment. The laser processing machine 100 is a laser cutting machine that cuts a sheet metal W. The laser processing machine 100 may be a laser welding machine that welds the sheet metal W. As shown in FIG. 1, the laser processing machine 100 includes a fiber laser oscillator 10, a process fiber 15, a processing unit 20, and an NC (Numerical Control) device 30. The fiber laser oscillator 10 is a laser oscillator of the first embodiment. The process fiber 15 transmits, to the processing unit 20, a laser beam emitted by the fiber laser oscillator 10. The NC device 30 controls processing of the sheet metal W by the laser processing machine 100. The NC device 30 is an example of a control device that controls the laser processing machine 100. The laser oscillator is not limited to the fiber laser oscillator.

The fiber laser oscillator 10 includes a pulse generation unit 11, a laser oscillation module 12, a feeding fiber 13, and a beam coupler 14. As will be described in detail later, the pulse generation unit 11 generates a driving voltage signal for driving the laser oscillation module 12 based on a power command signal supplied from the NC device 30, and supplies the driving voltage signal to the laser oscillation module 12.

The laser oscillation module 12 has a publicly known configuration including a plurality of laser diodes, a combiner, a high reflection fiber Bragg grating, an active fiber, and a low reflection fiber Bragg grating. The combiner optically couples laser beams emitted from the plurality of laser diodes and transmitted by an optical fiber. A rare earth element, which is typically Yb (ytterbium), is added to a core of the active fiber. The laser beam emitted from the combiner is made incident on the active fiber provided between the high reflection fiber Bragg grating and the low reflection fiber Bragg grating.

The laser beam emitted from the active fiber repeats reciprocation between the high reflection fiber Bragg grating and the low reflection fiber Bragg grating. The low reflection fiber Bragg grating emits a laser beam having a wavelength of, for example, 1060 nm to 1080 nm, which is different from a wavelength v of a laser beam emitted by the laser diode.

The laser beam emitted from the laser oscillation module 12 is made incident on a core of the feeding fiber 13. The feeding fiber 13 transmits the laser beam to the beam coupler 14.

The beam coupler 14 includes a collimating lens 141, a total reflection mirror 142, and a focusing lens 143. The collimating lens 141 collimates a laser beam of a divergent beam emitted from an emission end of the feeding fiber 13 and converts the laser beam into a collimated beam. The total reflection mirror 142 totally reflects the incident collimated beam and causes the collimated beam to be incident on the focusing lens 143. The focusing lens 143 focuses the laser beam of the incident collimated beam, converts the laser beam into a convergent beam, and causes the convergent beam to be incident on a core of the process fiber 15. The process fiber 15 transmits the laser beam to the processing unit 20.

The processing unit 20 includes a processing head 21 and a drive unit 22 that drives the processing head 21. The processing head 21 includes a collimating lens 211 and a focusing lens 212. The collimating lens 211 collimates the laser beam of a divergent beam emitted from an emission end of the process fiber 15 and converts the laser beam into a collimated beam. The focusing lens 212 focuses the laser beam of the incident collimated beam, converts the laser beam into a convergent beam, and irradiates the sheet metal W with the convergent beam. The drive unit 22 moves the processing head 21 along the sheet metal W such that the laser beam with which the sheet metal W is irradiated is moved for cutting the sheet metal W. The drive unit 22 may move the sheet metal W with the processing head 21 being fixed. The drive unit 22 may move the processing head 21 relative to the sheet metal W so as to cut the sheet metal W.

Next, a description will be given of an operation of the NC device 30 and the pulse generation unit 11 when the fiber laser oscillator 10 carries out a pulse oscillating operation so as to oscillate the laser beam in the laser processing machine 100 configured as described above.

Figure 2A:
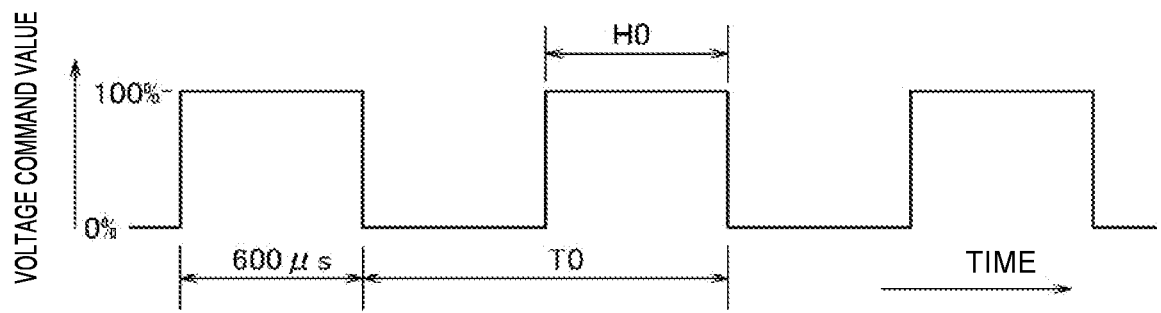
FIG. 2A is a waveform diagram showing a first example of a power command signal supplied by an NC device 30 in FIG. 1 to a pulse generation unit 11.

As shown in FIG. 2A, the NC device 30 supplies, to the pulse generation unit 11, a power command signal comprising a pulse signal that alternately repeats high and low. The power command signal is composed of a digital signal, and a height of each pulse of a high period indicates a voltage command value. The NC device 30 sets the voltage command value of the high period in accordance with a desired laser power of the laser beam to be emitted by the fiber laser oscillator 10 (the laser oscillation module 12). FIG. 2A shows the power command signal having a voltage command value (a voltage command value of 100%) corresponding to a laser power of 100%.

Assuming that a cycle of the power command signal is T0 and the high period is H0, the duty ratio is represented by (H0/T0)×100. The power command signal shown in FIG. 2A and a power command signal to be described later use an example when the duty ratio is 50%. The duty ratio is not limited to 50%, and may be set to any duty ratio, for example, from 10% to 90%. In the power command signal shown in FIG. 2A, the period H0 is 600 us as an example.

Figure 2B:
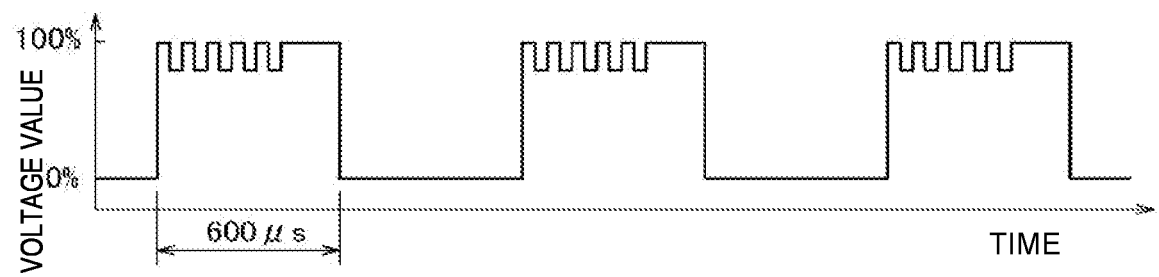
FIG. 2B is a waveform diagram showing a driving voltage signal generated by the pulse generation unit 11 to which the power command signal shown in FIG. 2A is input.

FIG. 2B shows the driving voltage signal generated by the pulse generation unit 11 when the power command signal shown in FIG. 2A is supplied to the pulse generation unit 11. The driving voltage signal generated by the pulse generation unit 11 is, for example, an analog signal. However, the driving voltage signal generated by the pulse generation unit 11 is not limited to the analog signal.

The pulse generation unit 11 generates a driving voltage signal comprising a pulse signal that alternately repeats high and low, based on the power command signal that is input. Since the voltage command value of the high period H0 of the power command signal is 100%, the pulse generation unit 11 generates a driving voltage signal having a voltage value of 100% during the high period. At this time, as shown in FIG. 2B, the pulse generation unit 11 modulates the voltage value in a pulsed manner for a preset period of time from a rising time of the high period. The pulse generation unit 11 modulates the voltage value in a pulsed manner so as to alternately repeat a high state in which the voltage value of the driving voltage signal is maintained and a low state in which the voltage value is lowered by a predetermined voltage value without being lowered to a voltage value (a minimum voltage value) of a low period of the driving voltage signal.

A pulse waveform superimposed on the driving voltage signal by the modulation of a voltage value will be referred to as a sub pulse. In other words, an auxiliary or fine pulse when the fine pulse is superimposed on a large pulse of two pulses discharged from the pulse generation unit 11 is referred to as the sub pulse. The period of time in which the sub pulses are superimposed during the high period from the rising time of the high period is 400 µs as an example.

Since the period H0 of the power command signal shown in FIG. 2A is 600 µs, the high period of the driving voltage signal is also 600 µs and the sub pulses are superimposed during the period of 400 µs, which is a part of the high period. The sub pulses are not superimposed in the period of time greater than 400 µs from the rising time of the high period.

Figure 3A:
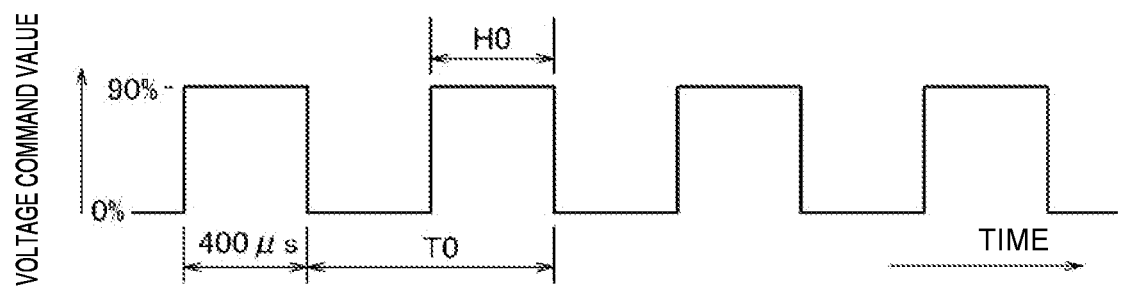
FIG. 3A is a waveform diagram showing a second example of the power command signal supplied by the NC device 30 to the pulse generation unit 11.
Figure 3B:
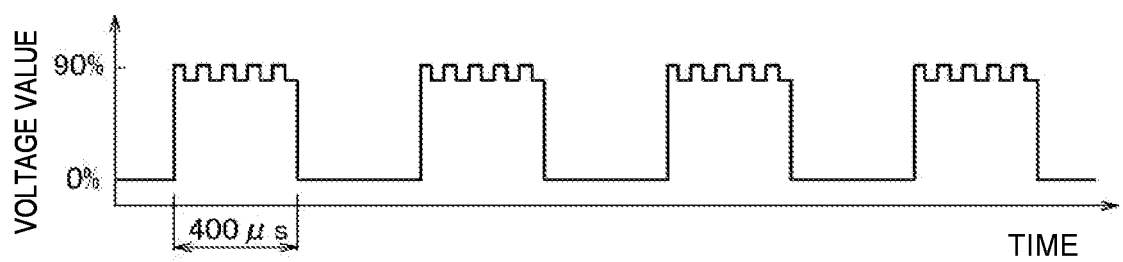
FIG. 3B is a waveform diagram showing a driving voltage signal generated by the pulse generation unit 11 to which the power command signal shown in FIG. 3A is input.

FIG. 3A shows a power command signal having a voltage command value of 90% corresponding to a laser power of 90% and whose period H0 is 400 µs. FIG. 3B shows the driving voltage signal generated by the pulse generation unit 11. Since the period H0 of the power command signal shown in FIG. 3A is 400 µs, the high period of the driving voltage signal is also 400 µs and the sub pulses are superimposed in the entire period of 400 µs as shown in FIG. 3B. If the high period of the driving voltage signal is equal to or less than the preset period of time described above, the sub pulses are superimposed in the entire high period of the driving voltage signal.

In this manner, the pulse generation unit 11 is configured to superimpose the sub pulses on the driving voltage signal by modulating, in a pulsed manner, the voltage value of the high period of the driving voltage signal when the power command signal has a voltage command value corresponding to a laser power that is greater than a predetermined laser power during the high period. On the other hand, the pulse generation unit 11 is configured not to superimpose the sub pulses on the driving voltage signal without modulating, in a pulsed manner, the voltage value of the high period of the driving voltage signal when the power command signal has a voltage command corresponding to a laser power that is equal to or lower than the predetermined laser power during the high period. The predetermined laser power represents a predetermined ratio to the laser power of 100%, and the predetermined ratio is 80%, for example.

Figure 4A:
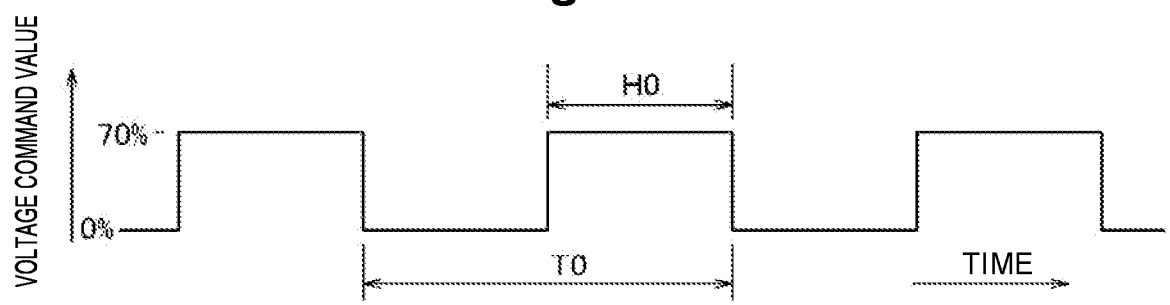
FIG. 4A is a waveform diagram showing a third example of the power command signal supplied by the NC device 30 to the pulse generation unit 11.
Figure 4B:
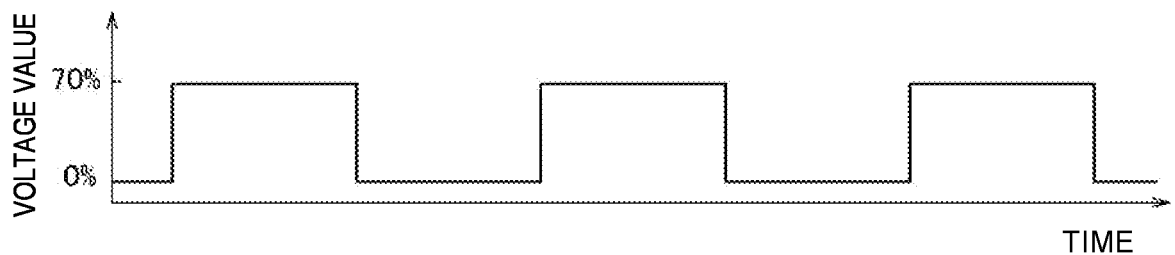
FIG. 4B is a waveform diagram showing a driving voltage signal generated by the pulse generation unit 11 to which the power command signal shown in FIG. 4A is input.

FIG. 4A shows a power command signal having a voltage command value of 70% that corresponds to a laser power of 70%. When the power command signal shown in FIG. 4A is input, the pulse generation unit 11 generates a driving voltage signal by which the sub pulses are not superimposed during the high period, as shown in FIG. 4B, because the input power command signal is the power command signal that has a voltage command value of 80% or less.

The sub pulse will be described in detail with reference to an enlarged view of one pulse of the driving voltage signal shown in FIG. 5. The range from the voltage value of 0% (the minimum voltage value) corresponding to the voltage command value of 0% to the voltage value of the period in which the sub pulse is low is referred to as a power limit rate PLR. Note that the minimum voltage value is not a voltage value of 0 but a predetermined small voltage value.

When the laser oscillation module 12 carries out the pulse oscillating operation so as to oscillate the laser beam, the stimulated Raman scattering (SRS) is generated if the laser power is high, and the SRS is not generated if the laser power is low. The power limit rate PLR is set to a voltage value corresponding to a laser power by which the SRS is not generated. It is preferable that the power limit rate PLR is set to a voltage value corresponding to a highest possible laser power by which the SRS is not generated. If the SRS is not generated when the voltage command value is 80%, the pulse generation unit 11 does not superimpose the sub pulses at a voltage command value of 80% or less, as described above. The power limit rate PLR at this time may be set to a voltage value of 80% in correspondence to the voltage command value of 80%.

Figure 5:
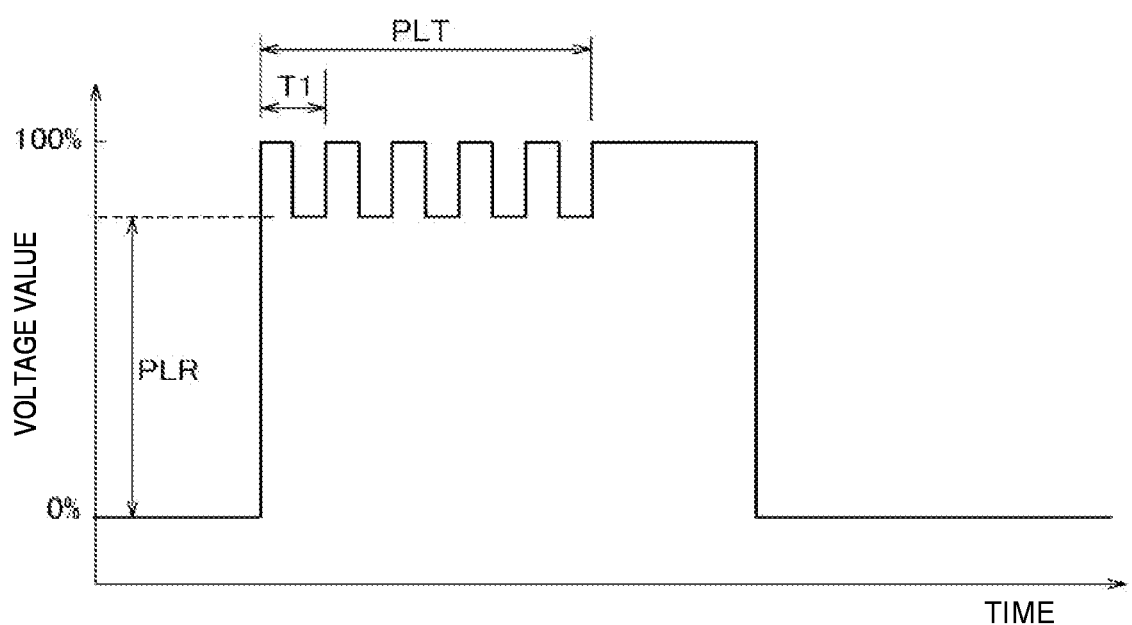
FIG. 5 is a partially enlarged waveform diagram for describing the details of a sub pulse superimposed in a high period of the driving voltage signal.

Assuming that the voltage value of the high period of the driving voltage signal is 100% as shown in FIG. 5, the pulse generation unit 11 modulates the voltage value so as to alternately repeat the voltage value of 100% and the voltage value of 80% during the high period of the driving voltage signal. As a result, during the high period of the driving voltage signal, the pulse generation unit 11 superimposes the sub pulses having a voltage value of 100% during the high period of the sub pulse and having a voltage value of 80% during the low period of the sub pulse.

A sub pulse period T1 is, for example, 20 µs. A duty ratio of the sub pulse is, for example, 50%. In FIGS. 2B, 3B, and 5, for convenience of illustration, the period T1 is expanded in the time direction. During the period in which the sub pulses are superimposed, the average value of the laser power per unit time of the laser beam emitted by the laser oscillation module 12 is reduced as compared with the case in which the sub pulses are not superimposed. However, even during the period in which the sub pulses are superimposed, the maximum value commanded by the voltage command value of the laser power is maintained. A period in which the sub pulses are superimposed will be referred to as a power limit time PLT. As described above, the power limit time PLT is 400 µs as an example.

The voltage value of the driving voltage signal by which the SRS begins to be generated in the laser oscillation module 12 changes depending on the individual difference of the laser oscillation module 12. Therefore, the power limit rate PLR may be set in accordance with each individual laser oscillation module 12. The period T1 and duty ratio of the sub pulse are not particularly limited.

Figure 6:
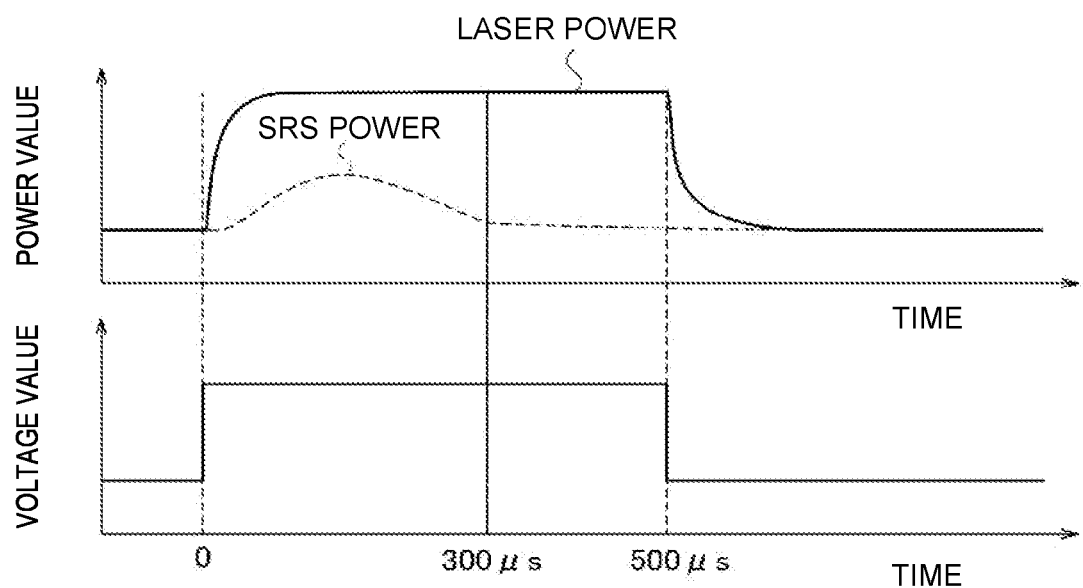
FIG. 6 is a waveform diagram showing a laser power when a laser oscillation module 12 in FIG. 1 oscillates a laser beam based on a driving voltage signal on which the sub pulses are not superimposed in the high period, and a power of stimulated Raman scattering generated at that time.
Figure 7:
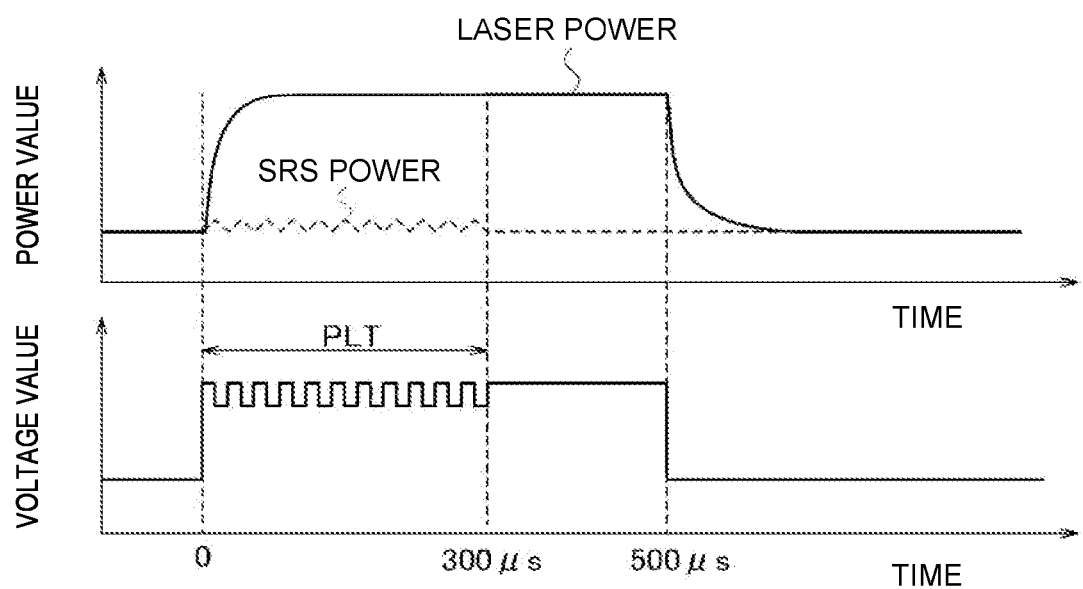
FIG. 7 is a waveform diagram showing a laser power when the laser oscillation module 12 oscillates a laser beam based on a driving voltage signal on which the sub pulses are superimposed in the high period, and a power of the stimulated Raman scattering generated at that time.

With reference to FIGS. 6 and 7, the actions and effects of the superimposition of the sub pulses on the driving voltage signal by the pulse generation unit 11 will be described. FIG. 6 shows a laser power when the laser oscillation module 12 oscillates a laser beam based on a driving voltage signal on which the sub pulses are not superimposed, and an SRS power generated at that time. The SRS power is a laser power indicating a generated amount of the SRS. The example shown in FIG. 6 shows the laser power and the SRS power when the high period of the driving voltage signal is 500 µs, the duty ratio is 50%, and the frequency is 1 kHz.

As shown in FIG. 6, the laser power indicated by the solid line rapidly increases from the minimum value as the driving voltage signal rises at time 0, then gradually increases to the maximum value and maintains the maximum value. The laser power rapidly decreases from the maximum value as the driving voltage signal drops at a point in time after passing by 500 μs, and then gradually decreases to the minimum value. The SRS power indicated by the broken line gradually increases from the minimum value to the maximum value as the laser power rises, and then gradually decreases to the minimum value at a point in time after passing by about 300 μs. As an example, the SRS is generated with a center wavelength of 1110 nm to 1130 nm. The minimum value is an extremely small value of almost 0. Note that in FIGS. 6 and 7, the laser power and the SRS power indicate temporal timings at which the respective power values are generated, and the respective power values in the vertical axis direction do not indicate the relationship between the two in the absolute value.

As can be seen from FIG. 6, according to the verification made by the inventors, it has been confirmed that the SRS is generated only in a period of time from the time 0 to about 300 μs even if the high period of the driving voltage signal is longer than 300 μs such as 500 μs. The SRS is generated only in a period of time from the time 0 to 400 μs at the longest.

FIG. 7 shows a laser power when the laser oscillation module 12 oscillates the laser beam based on the driving voltage signal on which the sub pulses are superimposed, and the SRS power generated at that time. FIG. 7 also shows the laser power and the SRS power when the high period of the driving voltage signal is 500 μs, the duty ratio is 50%, and the frequency is 1 kHz. In FIG. 7, the power limit time PLT is set to 300 μs.

As shown in FIG. 7, when the sub pulses are superimposed from the time 0 at which the SRS is generated to the power limit time PLT of 300 μs, a small amount of the SRS is generated during the high period of the sub pulse, but the SRS is not generated during the low period of the sub pulse. Therefore, although the SRS power once increases during the high period of the sub pulse, the SRS power decreases during the low period of the sub pulse. As a result, the SRS power does not become a mountain-shaped large value as shown in FIG. 6, and repeats increasing and decreasing by a small number. When the laser oscillation module 12 superimposes the sub pulses on the driving voltage signal, the SRS power can be significantly reduced. In the example described above, the power limit time PLT is set to 400 μs because the SRS is generated only in the period of time from the time 0 to 400 μs at the longest.

When the power command signal has the voltage command value corresponding to the laser power by which the SRS is generated during the high period in this manner, the method of suppressing stimulated Raman scattering of the first embodiment suppresses the SRS in a following manner. The pulse generation unit 11 modulates, in a pulsed manner, the voltage value of the high period of the generated driving voltage signal for a preset period of time from the rising time of the high period of the driving voltage signal, and superimposes the sub pulses on the driving voltage signal. The sub pulse superimposed by the pulse generation unit 11 alternately repeats the high state in which the voltage value of the driving voltage signal is maintained and the low state in which the voltage value is lowered to the voltage value corresponding to the voltage command value corresponding to the laser power by which the SRS is not generated.

In the manner described above, according to the fiber laser oscillator 10 including the laser oscillation module 12 that is a laser oscillator of the first embodiment, and the method of suppressing stimulated Raman scattering of the first embodiment, it is possible to effectively suppress the SRS. According to the laser processing machine 100 that is a laser processing machine of the first embodiment, since the beam quality is hardly deteriorated by the suppression of the SRS, it is possible to process the sheet metal W with a good processing quality.

As described above, even if the sub pulses are superimposed on the driving voltage signal, the maximum value commanded by the voltage command value of the laser power is maintained. Therefore, it is possible for the laser processing machine 100 to process the sheet metal W by using a laser beam having a high brightness.

Figure 8:
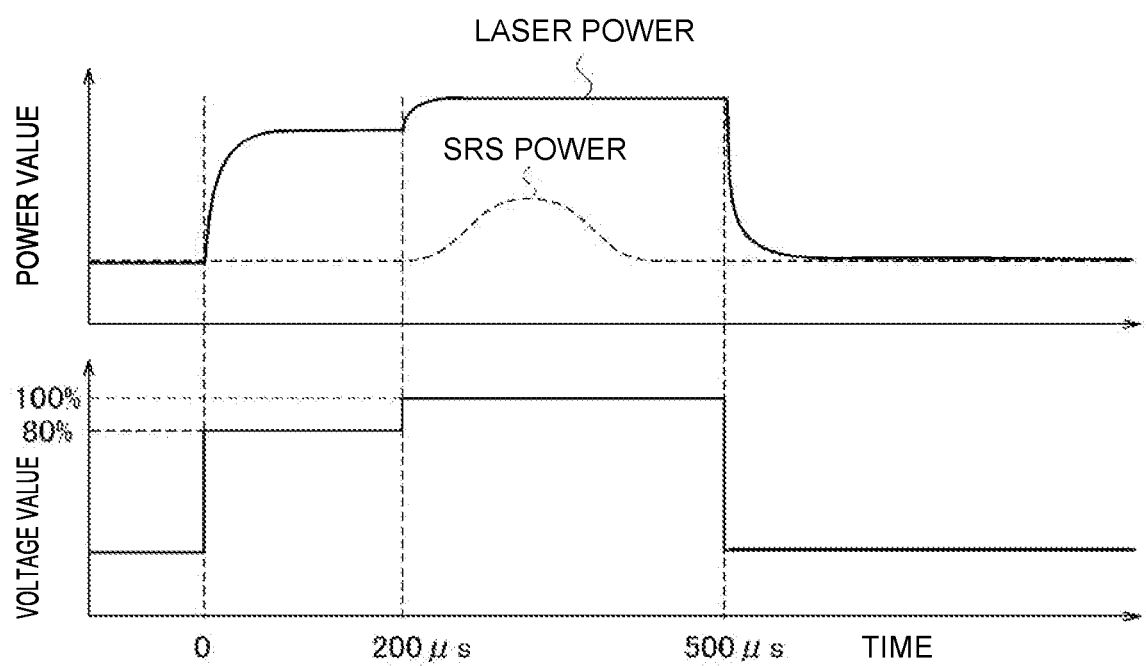
FIG. 8 is a waveform diagram showing a laser power when the laser oscillation module 12 oscillates a laser beam based on a driving voltage signal on which the sub pulses are not superimposed and in which the voltage value is uniformly reduced for a predetermined period of time from a rising time of the high period, and a power of the stimulated Raman scattering generated at that time.

FIG. 8 is a comparative example, and shows a laser power when the laser oscillation module 12 oscillates a laser beam by uniformly reducing a voltage value to 80% in a period of time from the time 0 to the time of 200 μs in lieu of superimposing the sub pulses, and an SRS power generated at that time. FIG. 8 also shows the laser power and the SRS power when the high period of the driving voltage signal is 500 μs, the duty ratio is 50%, and the frequency is 1 kHz.

Figure 9:
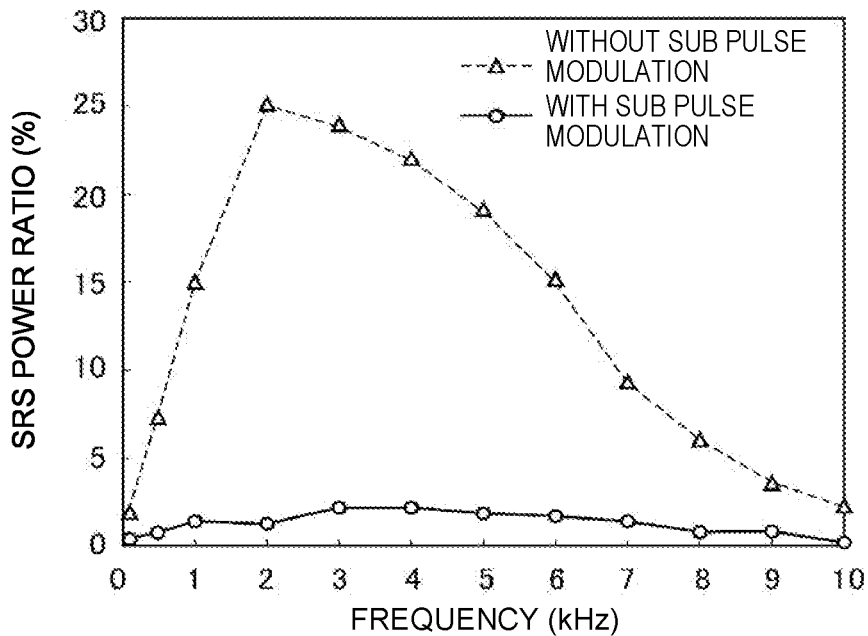
FIG. 9 is a characteristic diagram showing a change in the power ratio of the stimulated Raman scattering when the frequency of the power command signal is changed.
Figure 10:
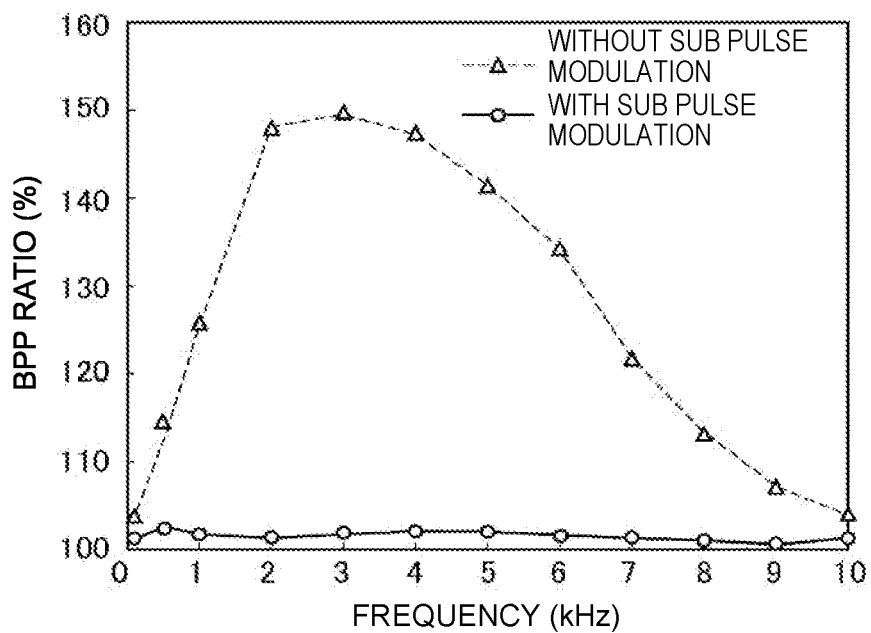
FIG. 10 is a characteristic diagram showing a change in the ratio of the beam parameter product when the frequency of the power command signal is changed.

As shown in FIG. 8, when the voltage value is reduced to 80% in the period of time from the time 0 to 200 μs, the SRS is not generated in the period of time from the time 0 to 200 μs. However, when the voltage value is increased to 100% at the point in time of 200 μs, a mountain-shaped SRS having a relatively large value, which is similar to that in FIG. 6, is generated after the point in time of 200 μs. On the other hand, as shown in FIG. 7, when the sub pulses are superimposed on the driving voltage signal, the mountain-shaped SRS is not generated after passing the power limit time PLT. The effect obtained by superimposing the sub pulses on the driving voltage signal by the pulse generation unit 11 will be further described with reference to FIGS. 9 and 10. FIG. 9 shows a change in the SRS power ratio when the frequency of the power command signal (the driving voltage signal) is changed. The SRS power ratio here is a value obtained by dividing the SRS power by the sum of the laser power and the SRS power. In other words, the SRS power ratio is the ratio of the laser power of 1110 nm to 1130 nm out of the total laser power including 1060 nm to 1080 nm and 1110 nm to 1130 nm. In FIGS. 9 and 10, a polygonal line connecting triangles indicates an SRS power ratio when the driving voltage signal is not modulated with the sub pulses, and a polygonal line connecting circles indicates an SRS power ratio when the driving voltage signal is modulated with the sub pulses. The minimum value of the frequency is 100 Hz.

As shown in FIG. 9, it can be seen that when the driving voltage signal is modulated with the sub pulses, only a small amount of the SRS is generated in the entire frequency range of 100 Hz to 10 kHz. It can be seen that when the driving voltage signal is not modulated with the sub pulses, the maximum SRS power ratio, which is as high as 25%, is generated at the frequency of 2 kHz and a large amount of the SRS is generated in the entire frequency range.

FIG. 10 shows a change in the BPP ratio when the frequency of the power command signal is changed. BPP indicates the beam parameter product, and is an index indicating a beam quality that is defined as a product of a radius of a beam waist and a half width at half maximum of a beam divergence angle. The BPP ratio here is a value obtained by dividing a BPP when the laser oscillation module 12 carries out the pulse oscillating operation at a laser power of 100% and a duty ratio of 50%, with a BPP when the laser oscillation module 12 carries out the CW oscillating operation at a laser power of 50%.

Note that if the NC device 30 supplies, to the pulse generation unit 11, a power command signal of a constant value in lieu of the pulse signal, the pulse generation unit 11 supplies a driving voltage signal of a constant value to the laser oscillation module 12 and the laser oscillation module 12 carries out the CW oscillating operation.

The average power, when the pulse oscillating operation is carried out at the laser power of 100% and the duty ratio of 50%, and the average power, when the CW oscillating operation is carried out at the laser power of 50%, are both 50%. Since the average powers are the same, heat loads per unit time applied to the fiber laser oscillator 10 and a measurement optical system are equal. When the heat load is increased, a thermal lens is caused and the BPP is deteriorated. Since the heat loads are set to be equal, the two BPPs can be appropriately compared.

As described above, the SRS is hardly generated when the laser oscillation module 12 carries out the CW oscillating operation. Therefore, the smaller the SRS is when the laser oscillation module 12 carries out the pulse oscillating operation at the laser power of 100% and the duty ratio of 50%, the closer the BPP ratio is to 100%. Conversely, this means that in FIG. 10, the closer the BPP ratio is to 100%, the less the SRS is generated when the laser oscillation module 12 carries out the pulse oscillating operation at the laser power of 100%.

As shown in FIG. 10, it can be seen that when the driving voltage signal is modulated with the sub pulses, only a small amount of the SRS is generated in the entire frequency range of 100 Hz to 10 kHz. It can be seen that when the driving voltage signal is not modulated with the sub pulses, the BPP ratio reaches nearly the maximum, which is 150%, at a frequency of 3 kHz and the BPP is deteriorated by the generation of the SRS in the entire frequency range.

Second Embodiment

Figure 11:
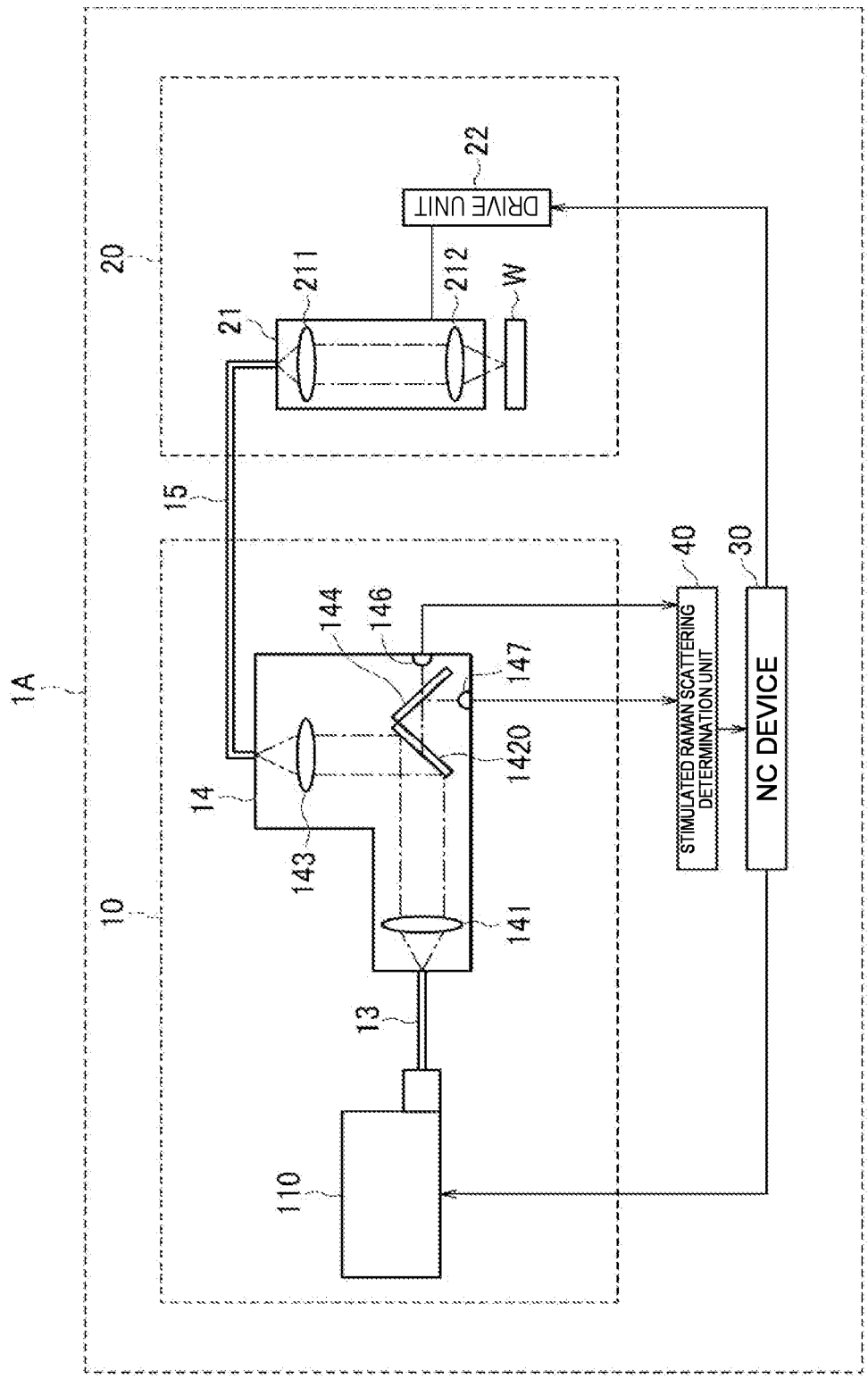
FIG. 11 is a configuration diagram showing a laser processing machine of a second embodiment.

FIG. 11 is a configuration diagram showing a laser processing machine 1A of a second embodiment. The laser processing machine 1A may be a laser cutting machine that cuts a sheet metal as an object to be processed, or may be a laser welding machine that welds the sheet metal. The processing of the object to be processed is not limited to cutting, and may be any processing such as welding or marking. In the second to seventeenth embodiments, the laser processing machine is the laser cutting machine, and the processing of the object to be processed is the cutting.

As shown in FIG. 11, the laser processing machine 1A includes the fiber laser oscillator 10 that is an example of a laser oscillator, the process fiber 15, the processing unit 20, the NC device 30, and a stimulated Raman scattering determination unit 40.

The fiber laser oscillator 10 includes a laser beam oscillation source 110, the feeding fiber 13 that propagates a laser beam emitted from the laser beam oscillation source 110, and the beam coupler 14 that connects the feeding fiber 13 and the process fiber 15. Details of the configuration and the operation of the fiber laser oscillator 10 will be described later.

The process fiber 15 propagates a laser beam emitted from the beam coupler 14 and causes the propagated laser beam to be incident on the processing head 21 of the processing unit 20. The processing unit 20 includes the processing head 21 and the drive unit 22 that drives the processing head 21.

The processing head 21 includes the collimating lens 211 and the focusing lens 212. The collimating lens 211 collimates the laser beam of a divergent beam emitted from the emission end of the process fiber 15 and converts the laser beam into a collimated beam. The focusing lens 212 focuses the incident laser beam of the collimated beam to be converted into a convergent beam, and irradiates the sheet metal W with the convergent beam. Although the drive unit 22 moves the processing head 21 along the sheet metal W, the drive unit 22 may move the sheet metal W with the processing head 21 being fixed. The drive unit 22 may move the processing head 21 relative to the sheet metal W so as to cut the sheet metal W.

The stimulated Raman scattering determination unit 40 determines a degree of the stimulated Raman scattering generated in the laser beam oscillation source 110, as will be described later. The NC device 30 controls the fiber laser oscillator 10 (the laser beam oscillation source 110) and the drive unit 22. The NC device 30 is an example of a control device that controls the fiber laser oscillator 10 and the drive unit 22.

Here, the configuration and the operation of the fiber laser oscillator 10 will be described in detail. The laser beam oscillation source 110 emits a laser beam, for example, having a wavelength of 1080 nm. The laser beam oscillation source 110 may emit a laser beam having a wavelength of 1060 nm to 1080 nm. Note that in the following description, the laser beam having a wavelength of 1060 nm to 1080 nm is also referred to as a basic wave. Since the internal configuration of the laser beam oscillation source 110 is publicly known, the description of the internal configuration thereof will be omitted. The fiber laser oscillator 10 may oscillate a continuous wave (CW) or a pulse wave.

The beam coupler 14 includes the collimating lens 141, a bend mirror 1420, the focusing lens 143, a dichroic mirror 144, a first photodiode 146, and a second photodiode 147. The first photodiode 146 is an example of a first detector, and the second photodiode 147 is an example of a second detector.

The collimating lens 141 collimates the laser beam of the divergent beam emitted from the emission end of the feeding fiber 13 and converts the laser beam into a collimated beam. The laser beam of the collimated beam is made incident on and reflected by the bend mirror 1420. In the bend mirror 1420, a reflecting surface of the laser beam is arranged at an angle of, for example, 45 degrees with respect to an optical axis of the collimated beam. The laser beam reflected by the bend mirror 1420 is made incident on the focusing lens 143. The focusing lens 143 focuses the incident collimated beam, converts the collimated beam into a convergent beam, and causes the convergent beam to be incident on the core of the process fiber 15.

The laser beam emitted from the feeding fiber 13 and traveling in the fiber laser oscillator 10 (the beam coupler 14) may include an unnecessary beam due to the SRS generated in the laser beam oscillation source 110. The unnecessary beam has, for example, a center wavelength of 1130 nm. Hereinafter, the unnecessary beam due to the SRS will be referred to as an SRS component.

The bend mirror 1420 has a property of reflecting 99% of an incident laser beam and transmitting the remainder. The laser beam transmitted through the bend mirror 1420 is made incident on the dichroic mirror 144. The dichroic mirror 144 transmits a laser beam having a wavelength of less than 1100 nm that does not include the SRS component from among the laser beams transmitted through the bend mirror 1420, and reflects a laser beam having a wavelength of 1100 nm or more that includes a wavelength of the SRS component. In the dichroic mirror 144, a reflecting surface of the SRS component is arranged at an angle of, for example, 135 degrees with respect to an optical axis of the laser beam transmitted through the bend mirror 1420.

Of the laser beams transmitted through the bend mirror 1420, the laser beam having a wavelength of 1100 nm or more that includes the SRS component will be referred to as a laser beam having a first frequency band. Of the laser beams transmitted through the bend mirror 1420, the laser beam having a wavelength of less than 1100 nm that does not include the SRS component will be referred to as a laser beam having a second frequency band.

In this manner, the dichroic mirror 144 divides the laser beams transmitted through the bend mirror 1420 into the laser beam that does not include the SRS component and the laser beam that includes the SRS component.

The first photodiode 146 detects a first beam amount of the laser beam having the second frequency band. The second photodiode 147 detects a second beam amount of the laser beam not having the second frequency band but having the first frequency band.

The stimulated Raman scattering determination unit 40 adds the first beam amount detected by the first photodiode 146 and the second beam amount detected by the second photodiode 147 to calculate the total beam amount. The total beam amount is a beam amount of the laser beams having the first and second frequency bands, and indicates a beam amount of the entire frequency band of the laser beams. Further, the stimulated Raman scattering determination unit 40 divides the second beam amount by the total beam amount to calculate the ratio of the beam amount of the SRS component to the total beam amount. The ratio of the beam amount of the SRS component to the total beam amount will be hereinafter referred to as a generated amount of the SRS component.

When the generated amount of the SRS component is greater than a predetermined generated amount, the stimulated Raman scattering determination unit 40 generates a status signal and supplies the status signal to the NC device 30. The predetermined generated amount is a predetermined threshold value.

The stimulated Raman scattering determination unit 40 may determine whether or not to output the status signal in the following manner. The stimulated Raman scattering determination unit 40 multiplies the second beam amount by N times (for example, 100 times), and supplies the status signal to the NC device 30 if the second beam amount multiplied by N times is greater than the first beam amount.

In this manner, the stimulated Raman scattering determination unit 40 may determine whether or not to output the status signal by comparing the total beam amount with the second beam amount that is the beam amount of the SRS component, or may determine whether or not to output the status signal by comparing the first beam amount with the second beam amount. In the former case, to compare between the total beam amount and the second beam amount is specifically to determine whether or not the ratio of the second beam amount to the total beam amount is greater than a predetermined threshold value. The latter case is equivalent to determining whether or not the ratio of the second beam amount to the first beam amount is greater than a predetermined threshold value because in order to facilitate the comparison between the first beam amount and the second beam amount, the magnitude relationship is determined after multiplying the second beam amount by N times, wherein N is a natural number. Note that the threshold values in the former case and the latter case are different, which are each set to an appropriate value.

Upon receiving the status signal supplied from the stimulated Raman scattering determination unit 40, the NC device 30 reduces the power command value to be supplied to the fiber laser oscillator 10 so as to reduce the laser power of the laser beam emitted from the fiber laser oscillator 10. Note that the power command value is a laser power value commanded in W (watt) or KW (kilowatt). In addition to this, the NC device 30 controls the drive unit 22 so as to slow down a processing velocity (a cutting velocity) of the sheet metal W. The NC device 30 reduces the power command value for the fiber laser oscillator 10 to the extent that the SRS component is not generated, and slows down the processing velocity such that the sheet metal can be cut even if the laser power is lowered. In this case, the fiber laser oscillator 10 may oscillate the continuous wave or the pulse wave.

When the fiber laser oscillator 10 oscillates the pulse wave, the NC device 30 may change the pulse frequency in lieu of adjusting the power command value and the processing velocity. The NC device 30 raises or lowers the pulse frequency so as to reduce the SRS component. In this case, since the average laser power does not change even if the pulse frequency is adjusted, the NC device 30 does not need to control the drive unit 22 so as to change the processing velocity of the sheet metal W.

Figure 12A:
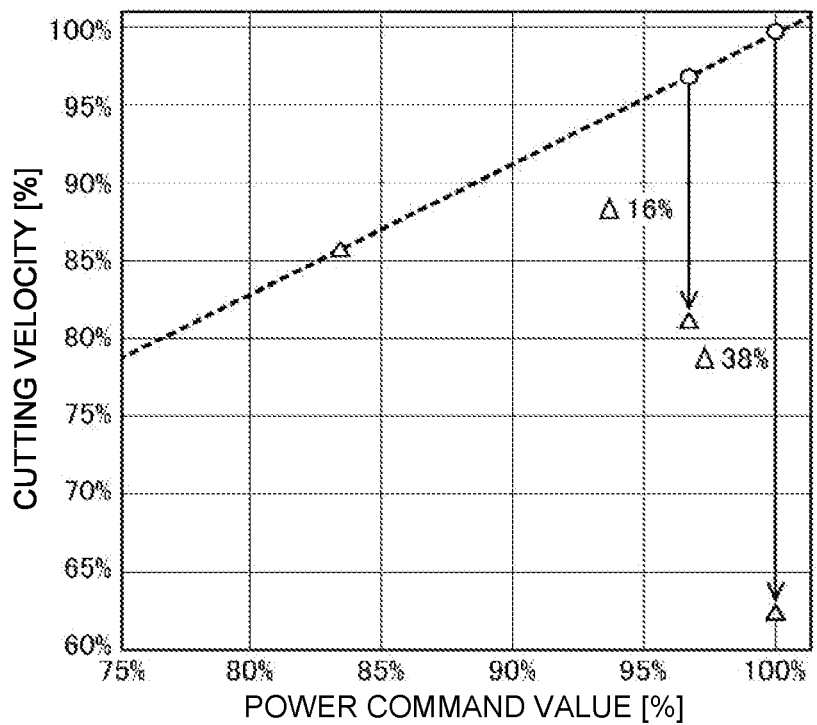
FIG. 12A is a characteristic diagram showing a difference in the maximum cutting velocity, when a stainless steel is cut, between the time at which an unnecessary beam due to the stimulated Raman scattering is not generated and the time at which the unnecessary beam is generated.
Figure 12B:
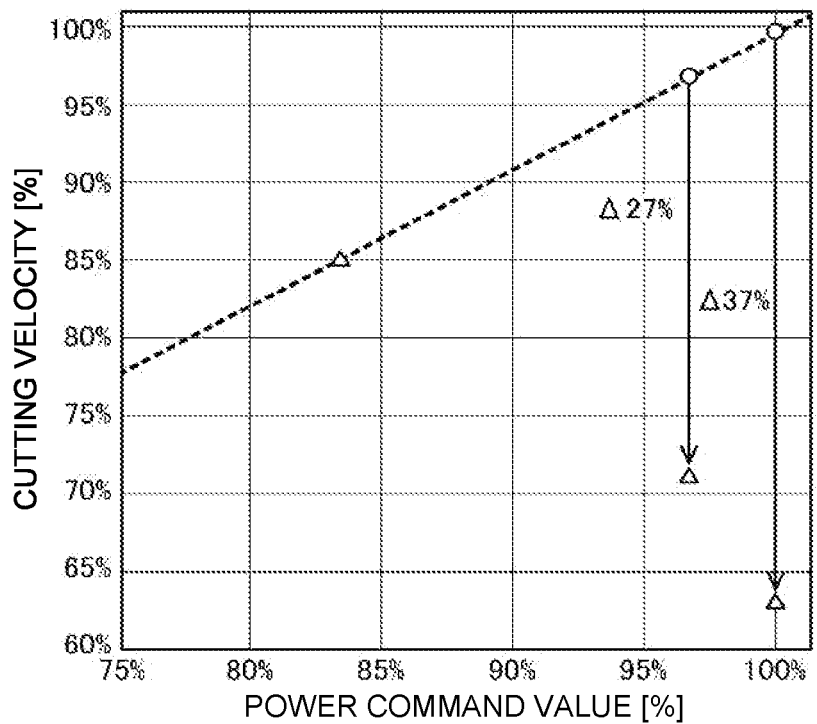
FIG. 12B is a characteristic diagram showing a difference in the maximum cutting velocity, when an aluminum plate is cut, between the time at which an unnecessary beam due to the stimulated Raman scattering is not generated and the time at which the unnecessary beam is generated.

FIG. 12A shows a relationship between a power command value and a maximum cutting velocity when a stainless steel having a thickness of 3.0 mm is cut by the laser processing machine 1A. FIG. 12B shows a relationship between a power command value and a maximum cutting velocity when an aluminum plate having a thickness of 3.0 mm is cut by the laser processing machine 1A. In FIGS. 12A and 12B, the broken line shows the relationship between the power command value and the maximum cutting velocity under the condition that the SRS component is not generated. Here, when the power command is expressed as a percentage, if the laser beam can have a maximum power of 10 kW at the emission end of the process fiber 15, for example, 100% indicates 10 kW and 75% indicates 7.5 kW. Further, the ratio of the maximum cutting velocity is the ratio of the maximum cutting velocity at the light intensity (the laser power) of the laser beam that is output according to each power command with respect to the maximum cutting velocity at the maximum output. Hereinafter, the light intensity of the laser beam will also be referred to as a laser power.

When the laser power of the laser beam at the emission end of the process fiber 15, which is output according to the power command commanded by the laser processing machine 1A, is lower than the expected laser power, the ratio of the maximum cutting velocity thereof is also reduced by n % in accordance with the actual laser power. In other words, FIGS. 12A and 12B show the ratio (the broken line) of the maximum cutting velocity expected for the power command at the emission end of the process fiber 15, and n % that is a percentage of reduction of the ratio of the cutting velocity corresponding to the laser power actually measured at the emission end of the process fiber 15 in response to the power command, from the ratio of the maximum cutting velocity.

As shown in FIGS. 12A and 12B, it is possible to cut the stainless steel and the aluminum plate each having a thickness of 3.0 mm at a maximum cutting velocity of 100% when the power command is 100% under the condition that the SRS component is not generated, and the ratio of each maximum cutting velocity increases in proportion to the power command. However, under the condition that the SRS component is generated, when the power command is 100%, the ratio of the maximum cutting velocity decreases by 37% or 38% as indicated by the downward arrow. In other words, depending on the situation of the SRS component generation, the ratio of the maximum cutting velocity is reduced by 35% or more. Further, when the SRS component is generated at the power command of 97%, the maximum cutting velocity is reduced by 16% or 27%. Note that it can be seen that in the stainless steel and the aluminum plate each having a thickness of 3.0 mm, the SRS component is generated when the power command is greater than 95% under the condition that the SRS component is generated.

As described above, even if the power command is 100% (even if the power command is 95% or more), when the SRS component is generated, the ratio of the maximum cutting velocity is lower than the ratio of the maximum cutting velocity when the power command is 80%.

Figure 13:
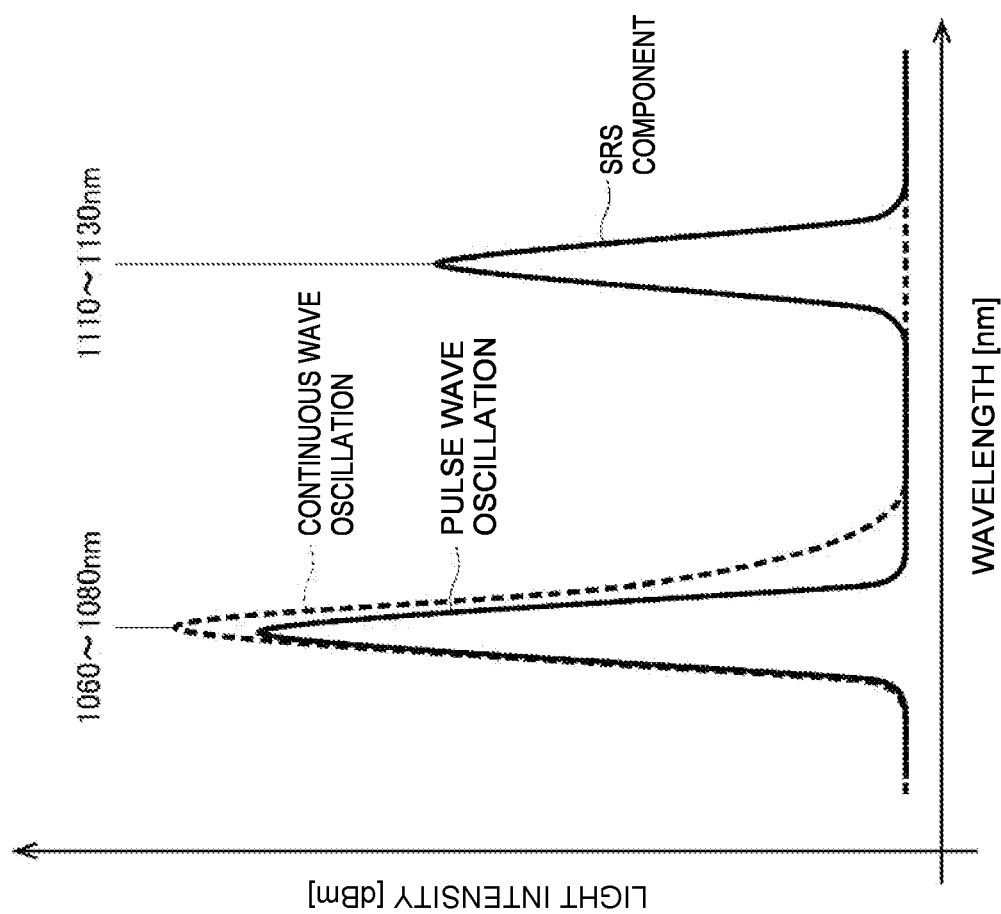
FIG. 13 is a characteristic diagram showing a relationship between the wavelength and the light intensity of the laser beam when the laser processing machine oscillates a continuous wave and when the laser processing machine oscillates a pulse wave.

FIG. 13 is a simplified diagram showing a light intensity of the SRS component and a light intensity of the basic wave for comparison. In the laser processing machine 1A, different amounts of the SRS component are generated when the laser beam oscillation source 110 oscillates the continuous wave and when the laser beam oscillation source 110 oscillates the pulse wave. It can be seen that a significantly larger amount of the SRS component is generated when the pulse wave is oscillated than when the continuous wave is oscillated. Note that the light intensity of the SRS component here refers to a light intensity of the SRS component that reduces the laser power, which affects the oscillation of the laser beam by the fiber laser oscillator 10. Although the SRS component may be generated during the continuous wave oscillation, the SRS component that reduces the laser power is hardly generated. Therefore, the SRS component during the continuous wave oscillation can be ignored.

Figure 14A:
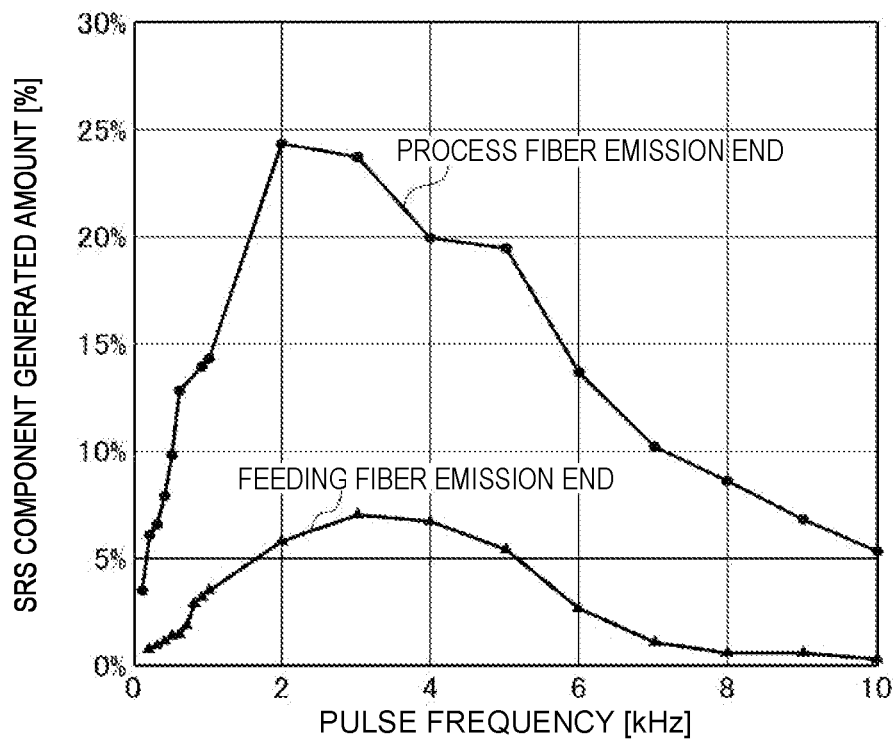
FIG. 14A is a characteristic diagram showing a relationship between the pulse frequency when the pulse wave is oscillated and the generated amount of the unnecessary beam due to the stimulated Raman scattering.
Figure 14B:
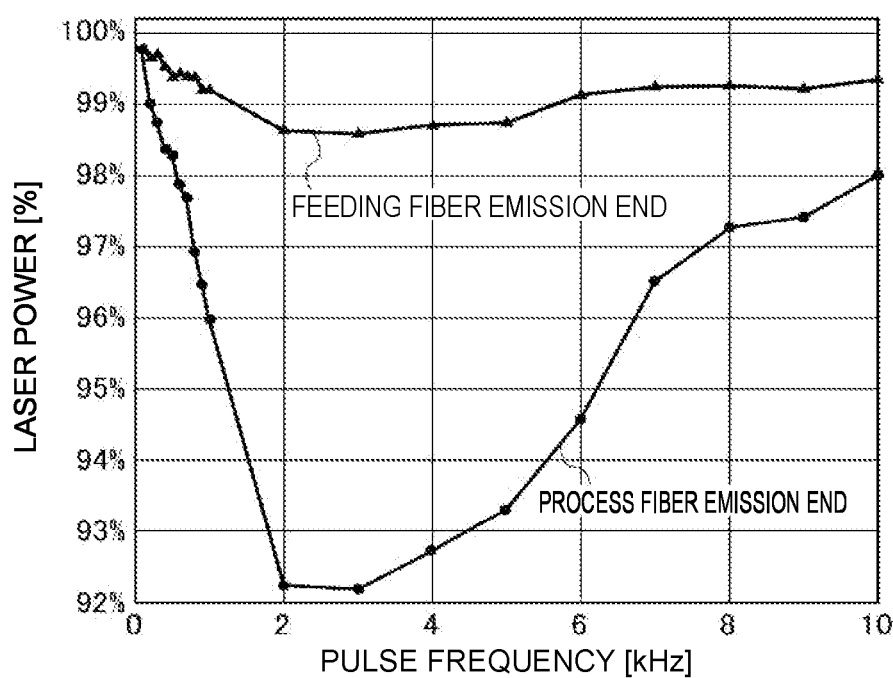
FIG. 14B is a characteristic diagram showing a relationship between the pulse frequency when the pulse wave is oscillated and the laser power.

FIGS. 14A and 14B show a change in the generated amount of the SRS component and a change in the laser power at each pulse frequency, respectively. The duty ratio of the pulse wave is 50%. As shown in FIG. 14A, the generated amount of the SRS component changes in accordance with the pulse frequency. As shown in FIG. 14B, the laser power changes in accordance with the pulse frequency. Note that in FIG. 14B, the laser power indicates a ratio of the laser power at the emission end of the process fiber 15 when the power command is 100% under the condition that the SRS component is generated, with the laser power at the emission end of the process fiber 15 being 100% when the power command is 100% under the condition that the SRS component is not generated. Further, in addition to a transition of the laser power at the emission end of the process fiber 15, FIGS. 14A and 14B also show transition of the laser power at the emission end of the feeding fiber 13.

From FIGS. 14A and 14B, it can be seen that if the pulse frequency changes, the generated amount of the SRS component changes, and as a result, the laser power changes. Specifically, the experiment result shows that the SRS component is rapidly generated on the emission end side of the process fiber 15 when the pulse frequency is set higher than 0 kHz and up to 2 kHz, and then the SRS component is gradually decreased when the pulse frequency is set to a higher value. In other words, the laser processing machine 1A can reduce the generated amount of the SRS component by changing the power command value, and can reduce the generated amount of the SRS component while suppressing the reduction in the laser power by adjusting the pulse frequency. Note that the pulse frequency of 0 kHz means the continuous wave oscillation, by which the laser power reduction due to the SRS component is hardly generated as described above.

As described above, when the generated amount of the SRS component is greater than the predetermined generated amount, the laser processing machine 1A of the second embodiment reduces the laser power by changing the power command value as a first method so that the processing condition is adjusted to suit the reduced laser power. When the fiber laser oscillator 10 oscillates the pulse wave, the laser processing machine 1A of the second embodiment changes the pulse frequency as a second method. For example, by changing the pulse frequency to the continuous wave or further increasing the frequency, the reduced laser power is adjusted so as to be recovered. Therefore, according to the laser processing machine 1A of the second embodiment, when the SRS component is generated, the processing quality is hardly deteriorated.

If a large amount of the SRS component is generated, the fiber laser oscillator 10 may fail. According to the laser processing machine 1A of the second embodiment, it is also possible to reduce the possibility that the fiber laser oscillator 10 will fail.

Third Embodiment

Figure 15:
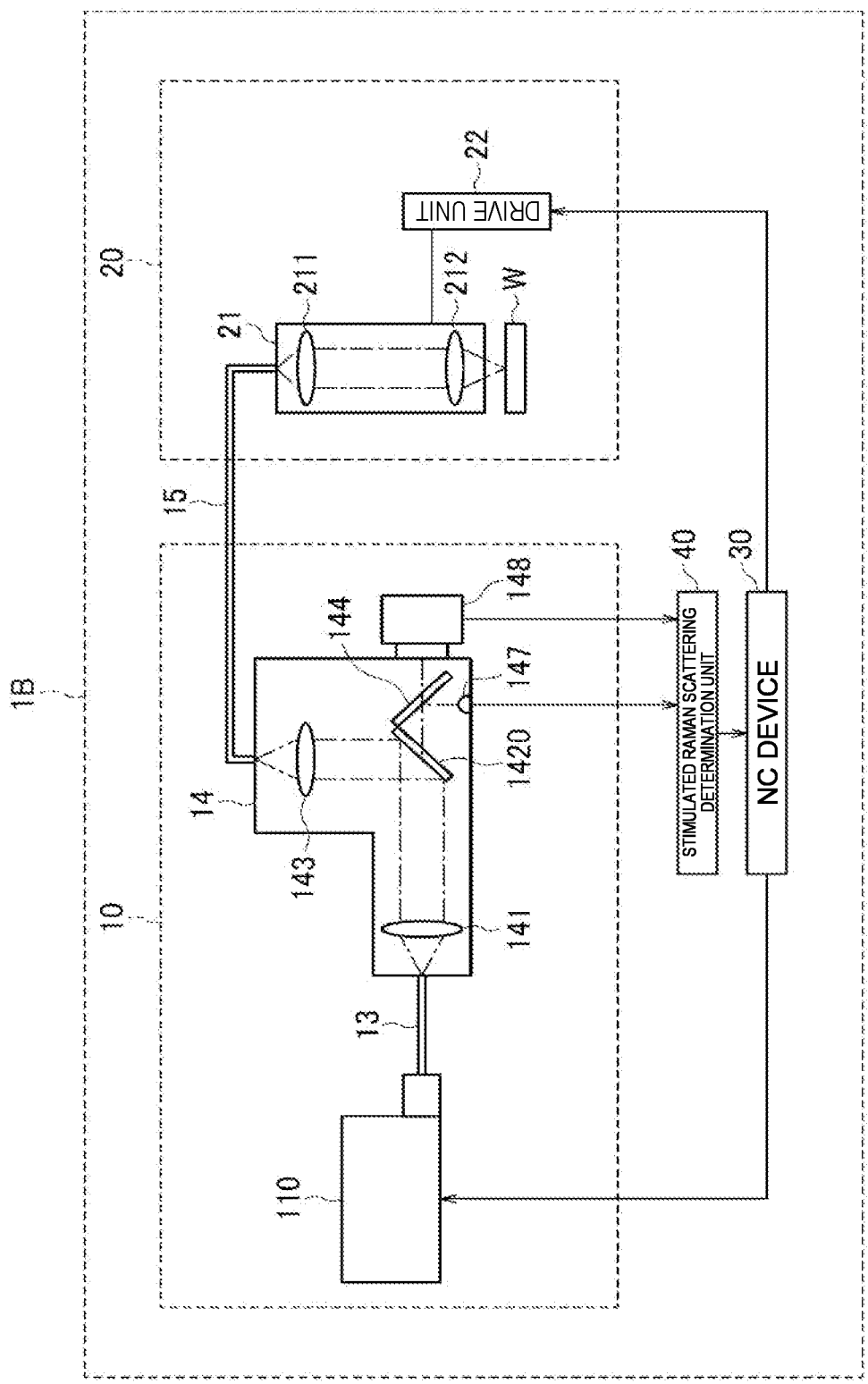
FIG. 15 is a configuration diagram showing a laser processing machine of a third embodiment.

A laser processing machine 1B according to a third embodiment shown in FIG. 15 will be described. As shown in FIG. 15, the laser processing machine 1B includes a first image pickup element 148 as a first detector that receives the first beam amount of the laser beam having the second frequency band in the beam coupler 14. The first image pickup element 148 is, for example, a CCD (charge-coupled device). Hereinafter, the first image pickup element 148 will be referred to as the first CCD 148. Other configurations in the beam coupler 14 are the same as those of the laser processing machine 1A. The basic operation and effect of the laser processing machine 1B are the same as those of the laser processing machine 1A described in FIGS. 11 to 14.

In other words, the first detector that receives the first beam amount of the laser beam having the second frequency band in the beam coupler 14 does not have to be the first photodiode 146, but may be the first CCD 148. The first CCD 148 can directly monitor the first beam amount of the laser beam having the second frequency band.

Fourth Embodiment

Figure 16:
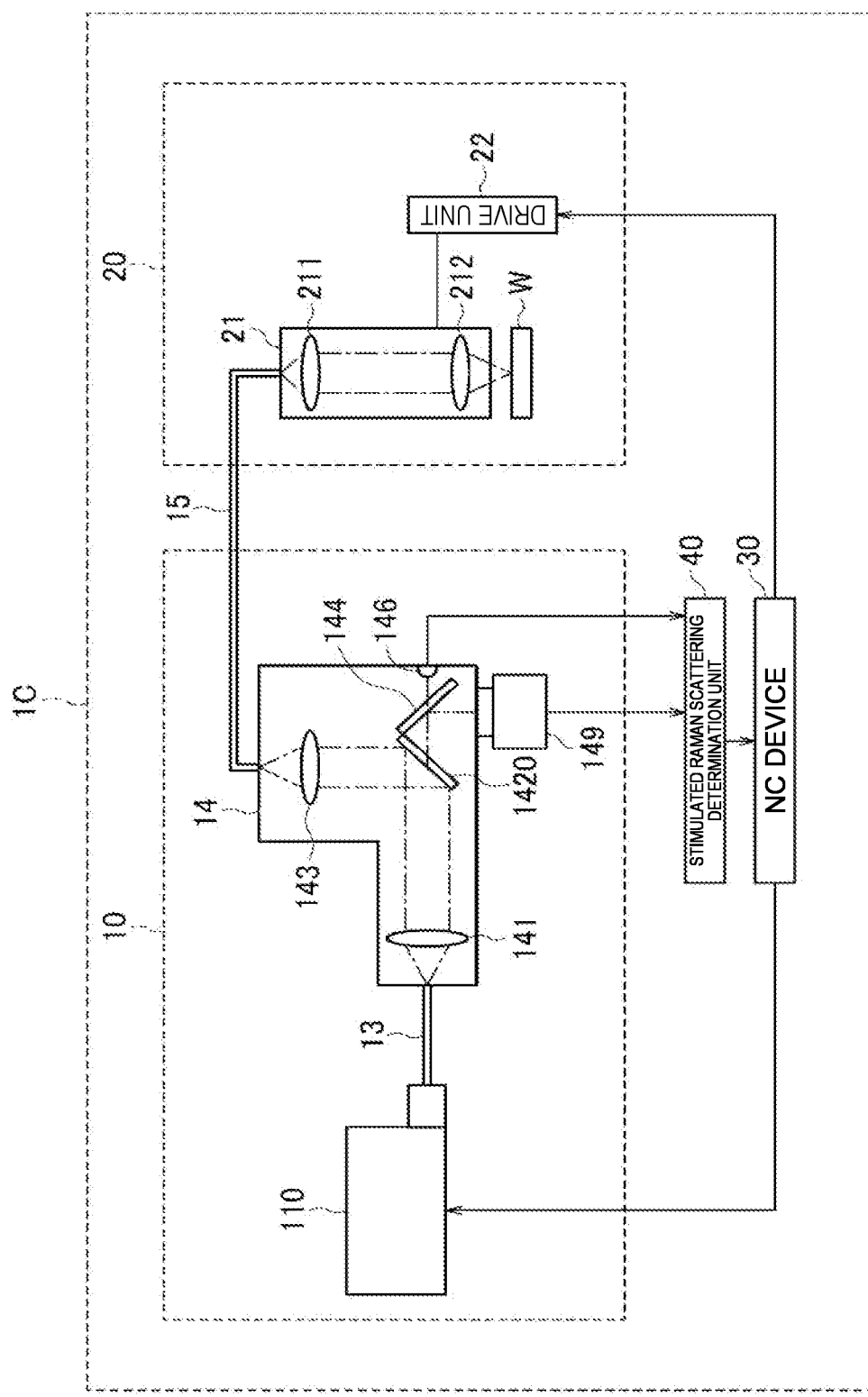
FIG. 16 is a configuration diagram showing a laser processing machine of a fourth embodiment.

A laser processing machine 1C according to a fourth embodiment shown in FIG. 16 will be described. As shown in FIG. 16, the laser processing machine 1C includes a second image pickup element 149 as a second detector that receives the second beam amount of the laser beam not having the second frequency band but having the first frequency band in the beam coupler 14. The second image pickup element 149 is, for example, a CCD. Hereinafter, the second image pickup element 149 will be referred to as the second CCD 149. Other configurations in the beam coupler 14 are the same as those of the laser processing machine 1A. The basic operation and effect of the laser processing machine 1C are the same as those of the laser processing machine 1A.

In other words, the second detector that receives the second beam amount of the laser beam not having the second frequency band but having the first frequency band in the beam coupler 14 does not need to be the second photodiode 147, but may be the second CCD 149. The second CCD 149 can directly monitor the second beam amount of the SRS component of the laser beam not having the second frequency band but having the first frequency band.

Fifth Embodiment

Figure 17:
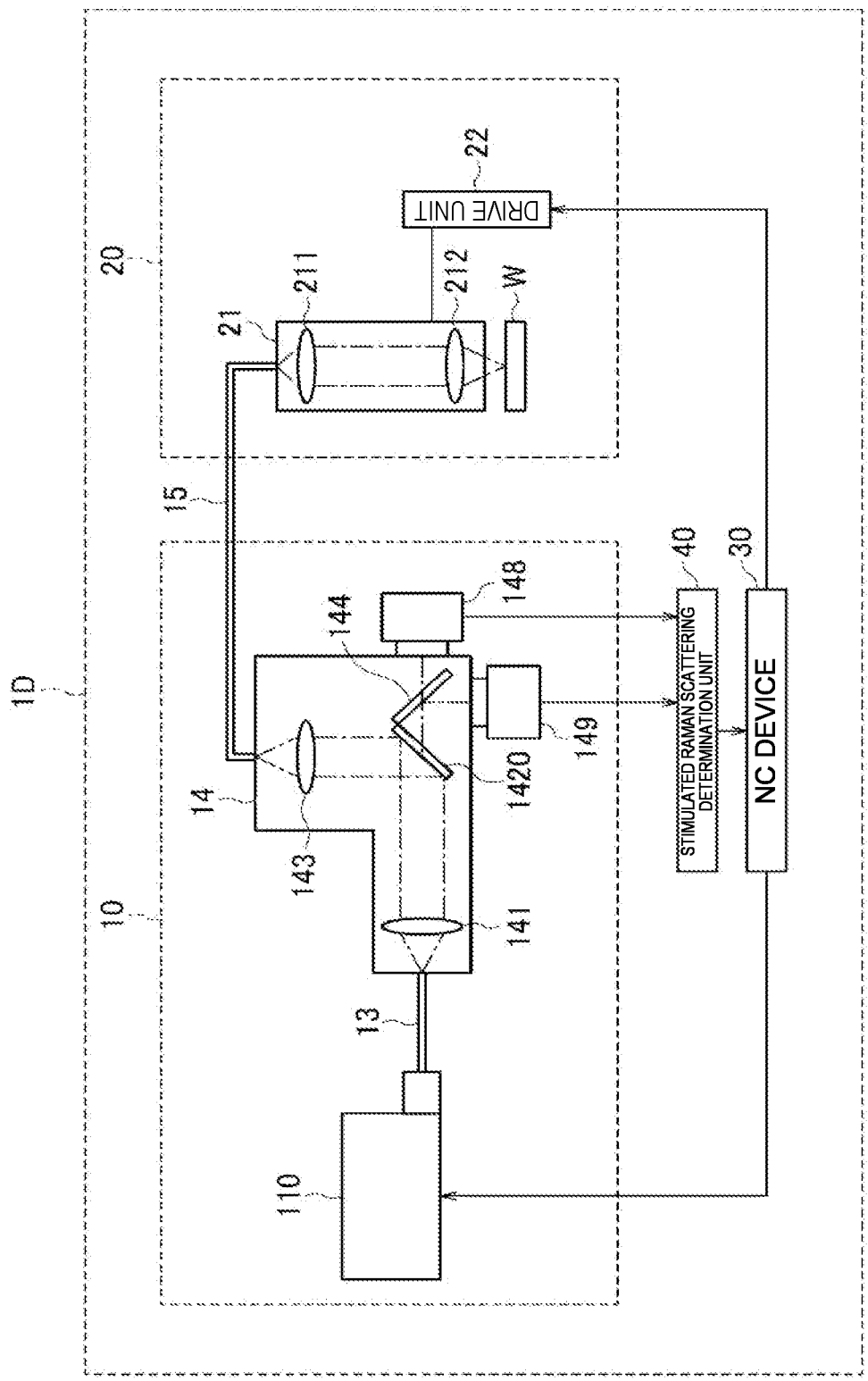
FIG. 17 is a configuration diagram showing a laser processing machine of a fifth embodiment.

A laser processing machine 1D according to a fifth embodiment shown in FIG. 17 will be described. As shown in FIG. 17, the laser processing machine 1D includes the first CCD 148 as a first detector that receives the first beam amount of the laser beam having the second frequency band in the beam coupler 14. Further, the laser processing machine 1D includes the second CCD 149 as a second detector that receives the second beam amount of the laser beam not having the second frequency band but having the first frequency band in the beam coupler 14. Other configurations in the beam coupler 14 are the same as those of the laser processing machine 1A. The basic operation and effect of the laser processing machine 1D are the same as those of the laser processing machine 1A.

Sixth Embodiment

Figure 18:
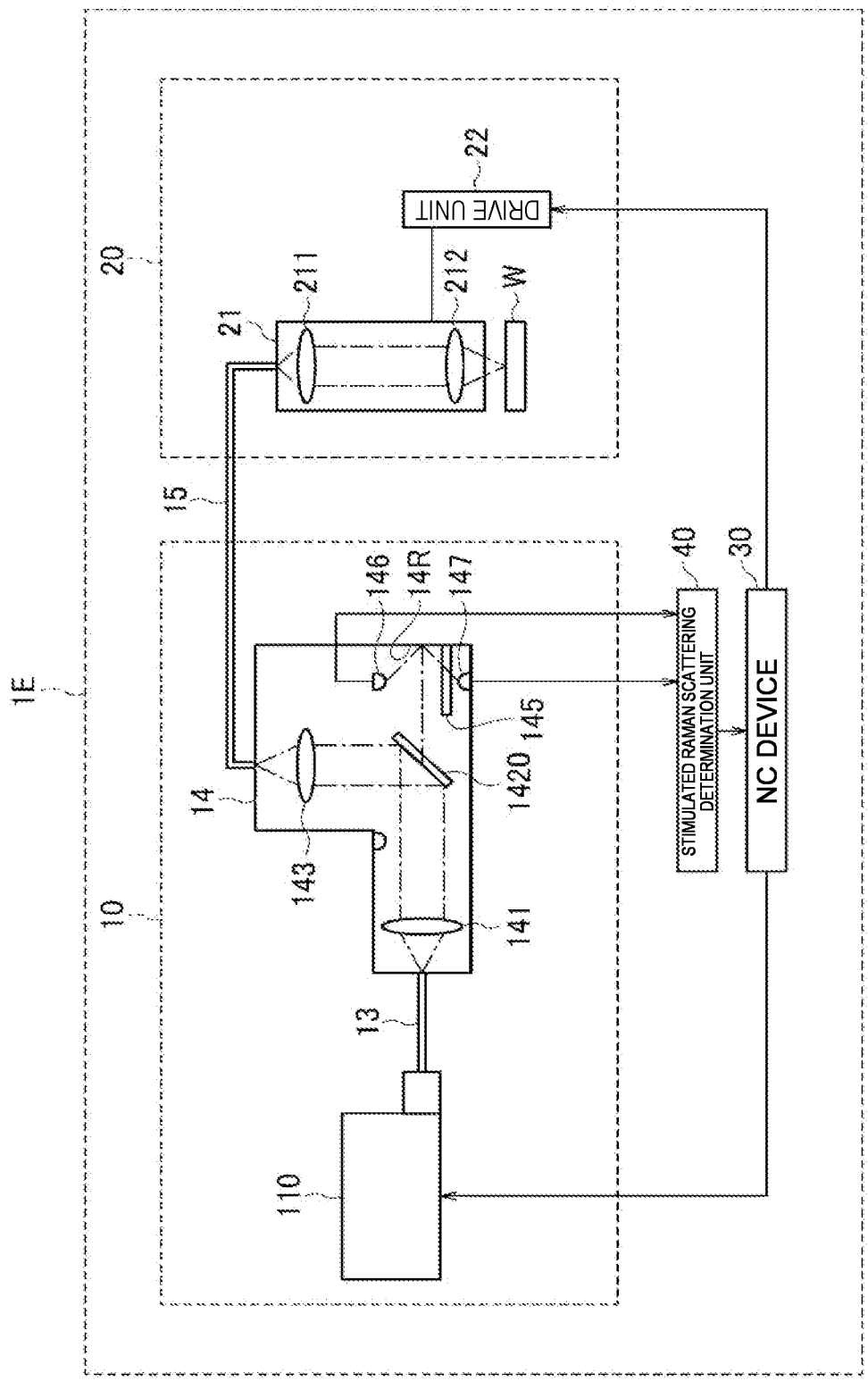
FIG. 18 is a configuration diagram showing a laser processing machine of a sixth embodiment.

A laser processing machine 1E according to a sixth embodiment shown in FIG. 18 will be described. As shown in FIG. 18, in the laser processing machine 1E, the laser beam transmitted through the bend mirror 1420 in the beam coupler 14 is reflected by a reflecting surface 14R provided on an inner wall of the beam coupler 14 and is made incident on the first photodiode 146. The first photodiode 146 receives a third beam amount of the reflected laser beam. In other words, the first photodiode 146 receives the third beam amount of the laser beams having the first and second frequency bands. The third beam amount in the sixth embodiment corresponds to the total beam amount in the second to fifth embodiments.

Further, the laser beam transmitted through the bend mirror 1420 in the beam coupler 14 is reflected by the reflecting surface 14R provided on the inner wall of the beam coupler 14 and is made incident on the second photodiode 147 via a bandpass filter 145. The bandpass filter 145 transmits, of the frequency bands that are made incident, the first frequency band having a wavelength of 1100 nm or more. Therefore, the second photodiode 147 receives the second beam amount of the laser beam that does not include the second frequency band but includes the first frequency band.

According to the sixth embodiment, it is not necessary to divide the entire wavelength band of the laser beam into the wavelength of 1100 nm or more and the wavelength of less than 1100 nm. Also, the stimulated Raman scattering determination unit 40 does not need to calculate the total beam amount by adding the first beam amount that does not include the SRS component and the second beam amount of the SRS component as in the second to fifth embodiments. Therefore, it is possible to reduce the step of calculating, by the stimulated Raman scattering determination unit 40, the total beam amount.

In the sixth embodiment, the stimulated Raman scattering determination unit 40 divides, by the third beam amount received by the first photodiode 146, the second beam amount received by the second photodiode 147 so as to calculate the ratio of the generated amount of the SRS component to the third beam amount, which is the total of the received amount. The basic operation and effect of the laser processing machine 1E are the same as those of the laser processing machine 1A.

Seventh Embodiment

Figure 19:
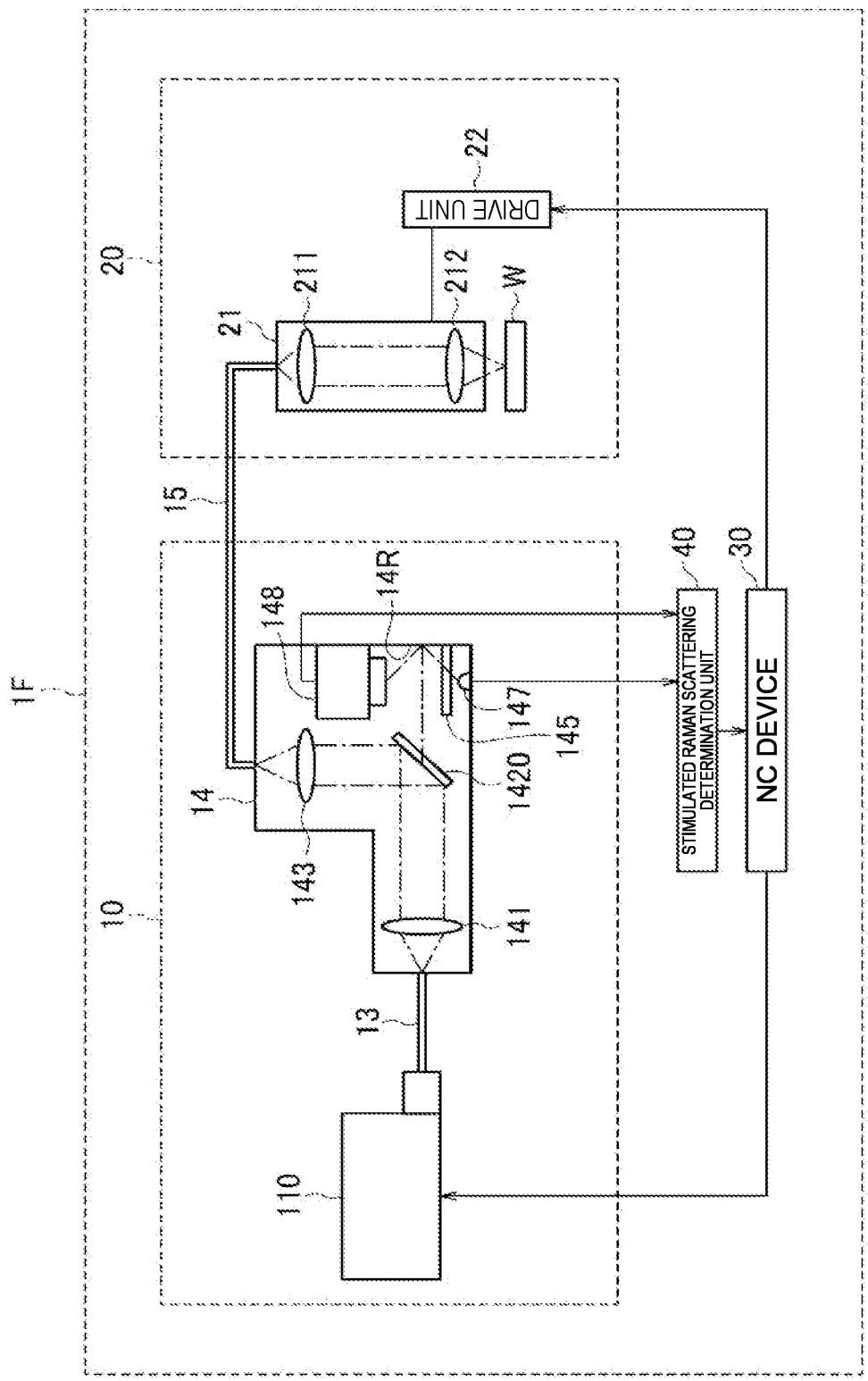
FIG. 19 is a configuration diagram showing a laser processing machine of a seventh embodiment.

A laser processing machine 1F according to a seventh embodiment shown in FIG. 19 will be described. As shown in FIG. 19, the laser processing machine 1F includes the first CCD 148 as a first detector that receives the third beam amount of the laser beam transmitted through the bend mirror 1420 and reflected by the reflecting surface 14R provided on the inner wall. The third beam amount received by the first CCD 148 corresponds to the total beam amount. Other configurations in the beam coupler 14 are the same as those of the laser processing machine 1E. The basic operation and effect of the laser processing machine 1F are the same as those of the laser processing machine 1E described in FIG. 18.

Eighth Embodiment

Figure 20:
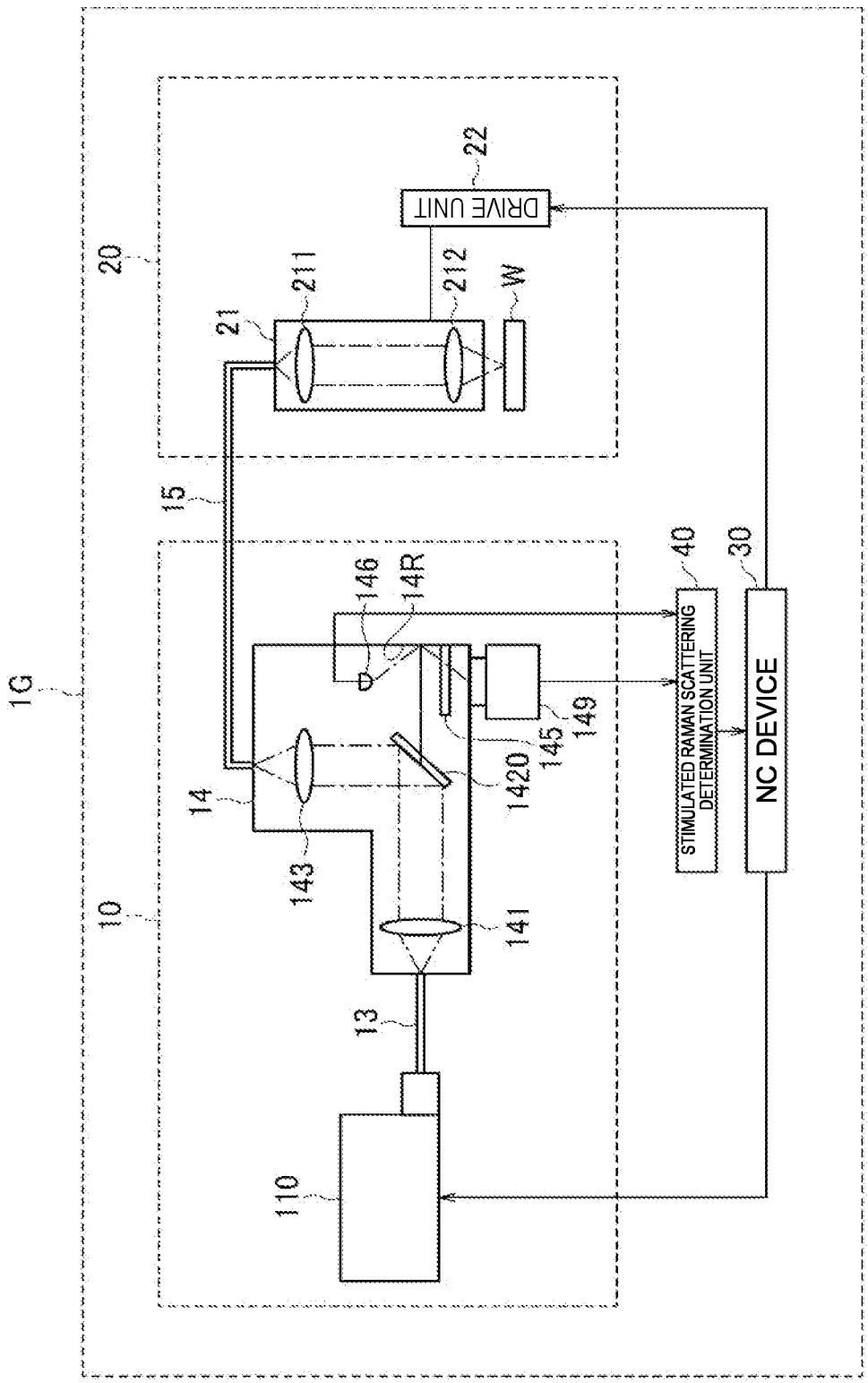
FIG. 20 is a configuration diagram showing a laser processing machine of an eighth embodiment.

A laser processing machine 1G according to an eighth embodiment shown in FIG. 20 will be described. As shown in FIG. 20, the laser processing machine 1G includes the second CCD 149 as a second detector that receives the second beam amount of the laser beam in which the first frequency band has been transmitted by the bandpass filter 145. Other configurations in the beam coupler 14 are the same as those of the laser processing machine 1E. The basic operation and effect of the laser processing machine 1G are the same as those of the laser processing machine 1E.

Ninth Embodiment

Figure 21:
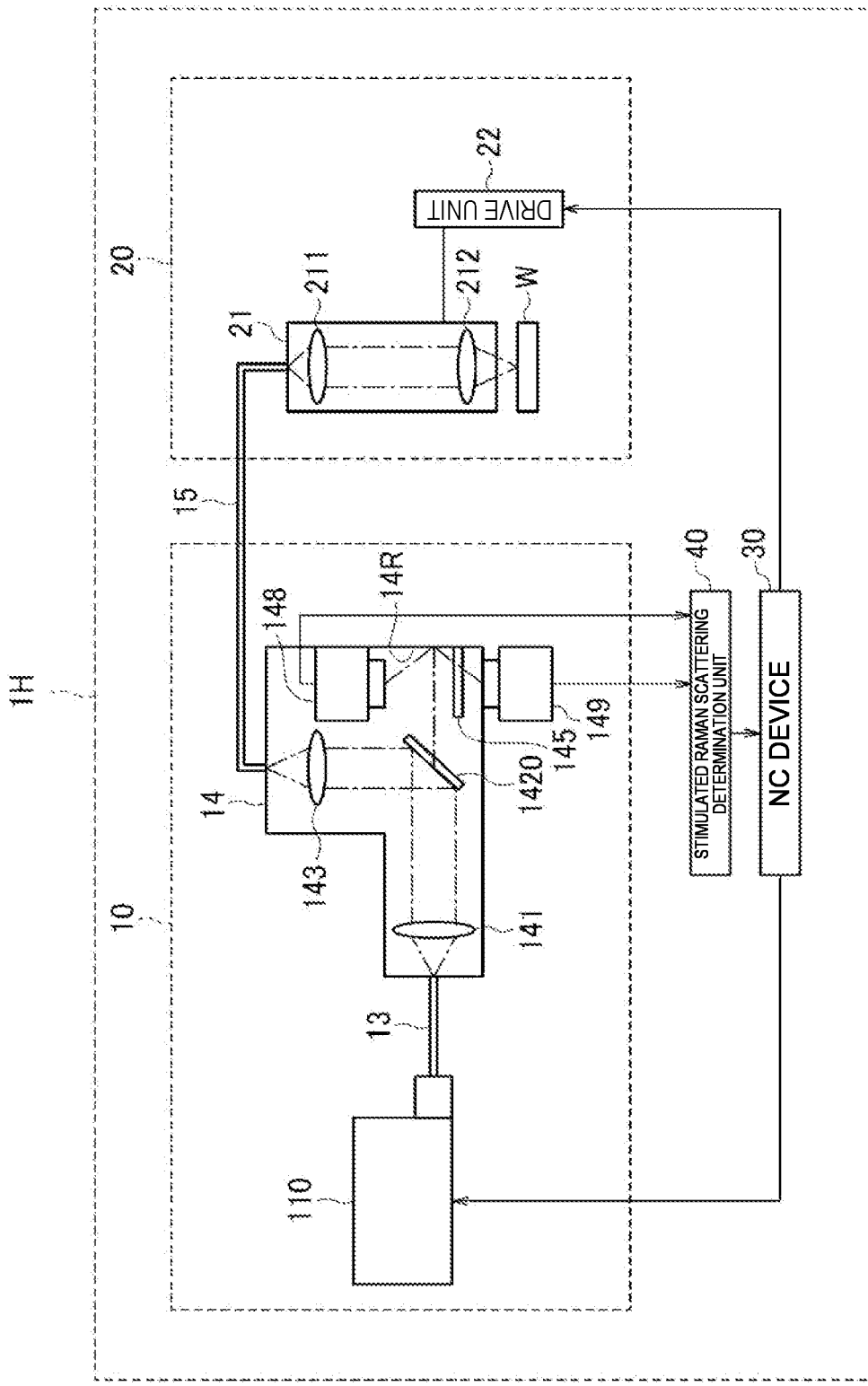
FIG. 21 is a configuration diagram showing a laser processing machine of a ninth embodiment.

A laser processing machine 1H according to a ninth embodiment shown in FIG. 21 will be described. As shown in FIG. 21, the laser processing machine 1H includes the first CCD 148 as a first detector that receives the third beam amount of the laser beam transmitted through the bend mirror 1420 and reflected by the reflecting surface 14R provided on the inner wall. Further, the laser processing machine 1H includes the second CCD 149 as a second detector that receives the second beam amount of the laser beam in which the first frequency band has been transmitted by the bandpass filter 145. The basic operation and effect of the laser processing machine 1H are the same as those of the laser processing machine 1E.

Tenth Embodiment

Figure 22:
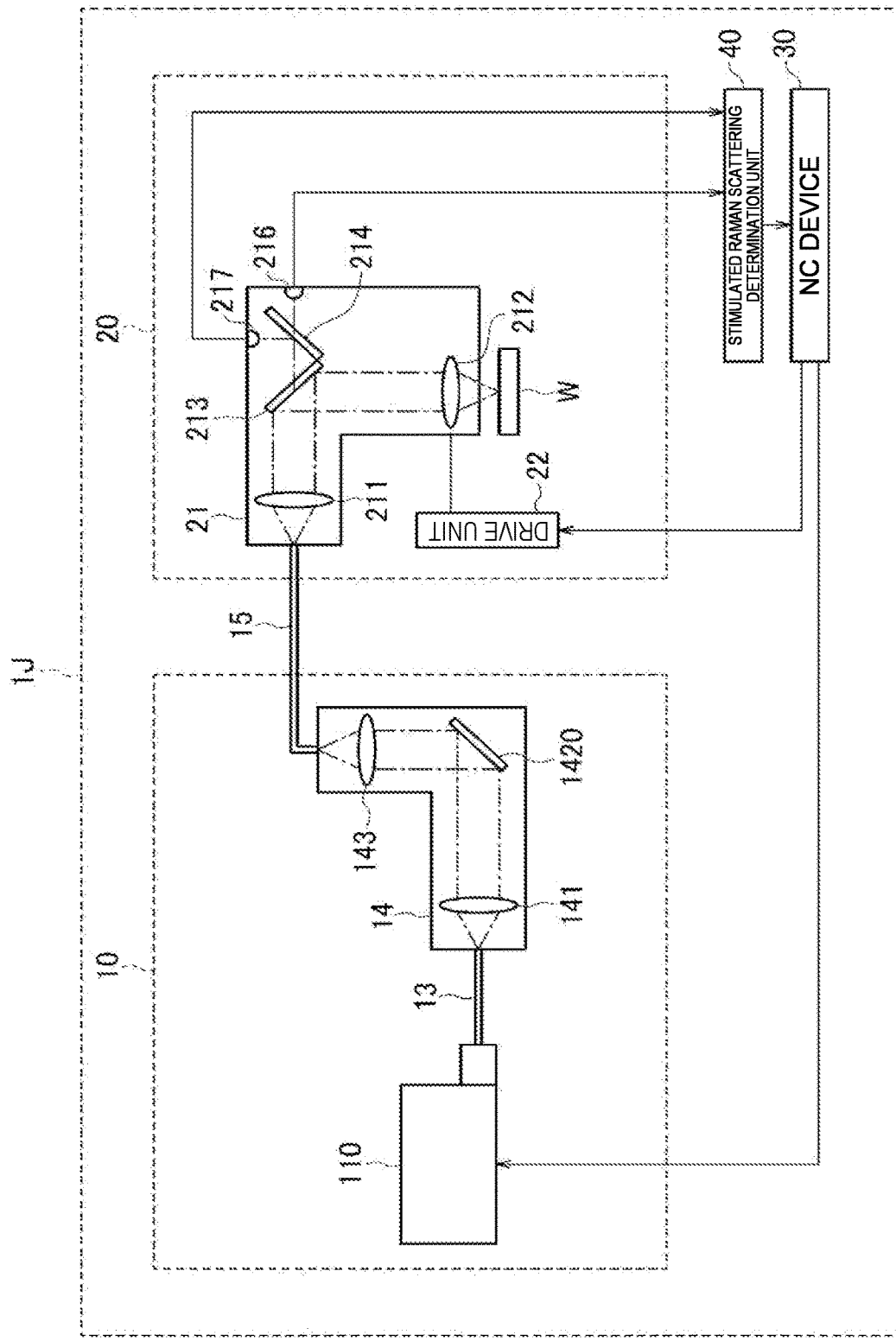
FIG. 22 is a configuration diagram showing a laser processing machine of a tenth embodiment.

A laser processing machine 1J according to a tenth embodiment shown in FIG. 22 will be described. As shown in FIG. 22, in the tenth embodiment, in addition to the collimating lens 211 and the focusing lens 212, the processing head 21 further includes a bend mirror 213, a dichroic mirror 214, a first photodiode 216, and a second photodiode 217. In the tenth embodiment, the beam coupler 14 may only include the collimating lens 141, the bend mirror 1420, and the focusing lens 143. The first photodiode 216 is an example of a first detector, and the second photodiode 217 is an example of a second detector.

The laser beam of the divergent beam emitted by the process fiber 15 is collimated by the collimating lens 211, converted into a collimated beam, and made incident on the bend mirror 213. In the bend mirror 213, a reflecting surface of the laser beam is arranged at an angle of, for example, 135 degrees with respect to an optical axis of the laser beam emitted from the collimating lens 211. The laser beam reflected by the bend mirror 213 is made incident on the focusing lens 212. The focusing lens 212 focuses the incident laser beam and irradiates the sheet metal W with the laser beam.

The laser beam emitted by the process fiber 15 and traveling in the processing head 21 may include the SRS component generated in the fiber laser oscillator 10. The bend mirror 213 has a property of reflecting 99% of an effective laser beam that is made incident and transmitting the remainder. The dichroic mirror 214 reflects the laser beam having the first frequency band that includes the SRS component, and transmits the laser beam having the second frequency band that does not include the SRS component. In the dichroic mirror 214, a reflecting surface of the laser beam is arranged at an angle of, for example, 45 degrees with respect to an optical axis of the laser beam transmitted through the bend mirror 213.

The first photodiode 216 receives the first beam amount of the laser beam having the second frequency band transmitted through the dichroic mirror 214. The second photodiode 217 receives the second beam amount of the laser beam having the first frequency band reflected by the dichroic mirror 214.

The basic operation and effect of the laser processing machine 1J shown in FIG. 22 are the same as those of the laser processing machine 1A.

The beam transmittance for each wavelength differs depending on the difference between the coating of the bend mirror 1420 in the beam coupler 14 and the coating of the bend mirror 213 in the processing head 21. Therefore, although there is a difference in the intensity of a scattered beam observed in the beam coupler 14 and the processing head 21, it is possible to measure the SRS component either in the beam coupler 14 or in the processing head 21.

Eleventh Embodiment

Figure 23:
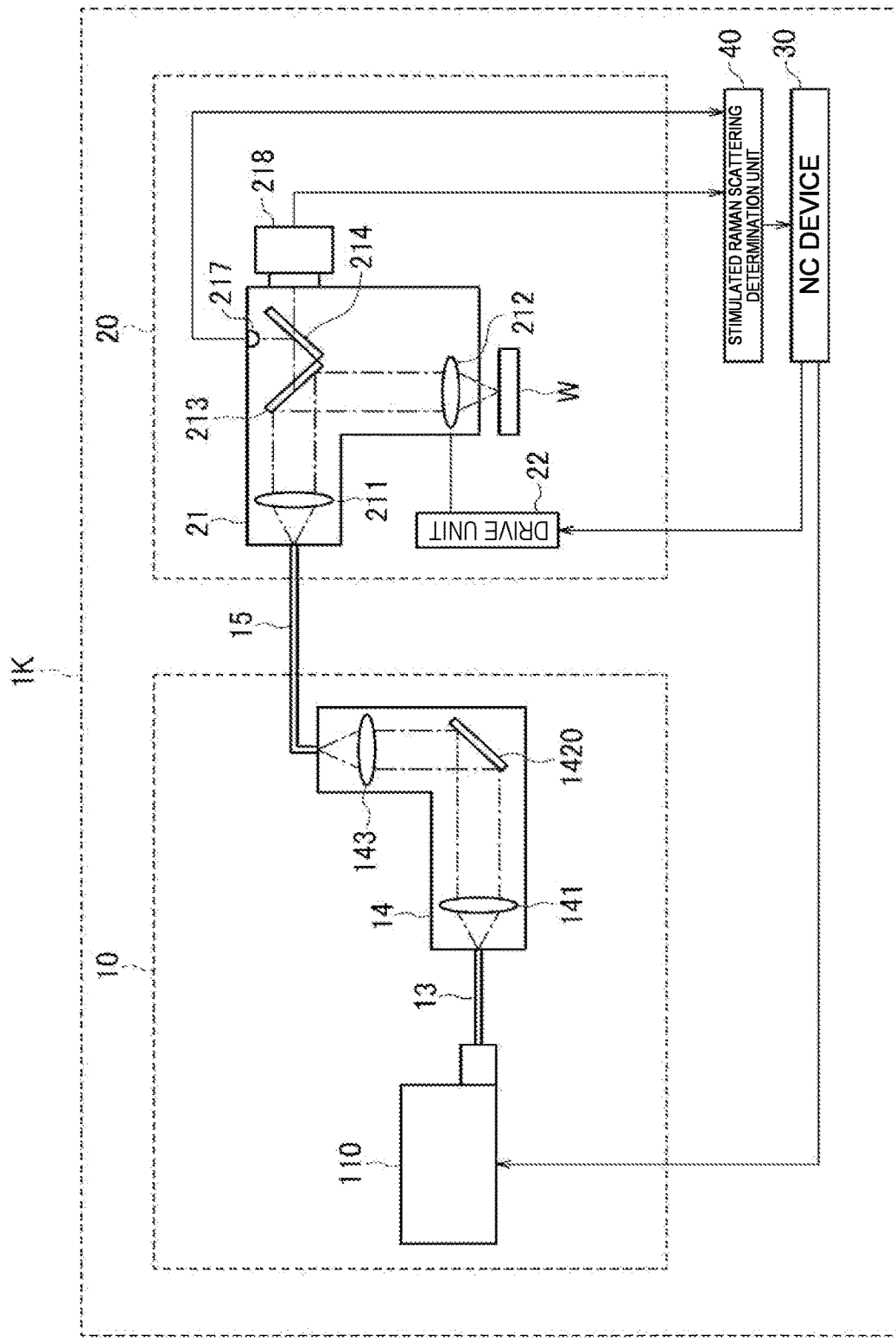
FIG. 23 is a configuration diagram showing a laser processing machine of an eleventh embodiment.

A laser processing machine 1K according to an eleventh embodiment shown in FIG. 23 will be described. As shown in FIG. 23, the laser processing machine 1K includes a first image pickup element 218 as a first detector that receives the first beam amount of the laser beam having the second frequency band transmitted through the dichroic mirror 214 in the processing head 21. The first image pickup element 218 is, for example, a CCD. Hereinafter, the first image pickup element 218 will be referred to as the first CCD 218. Other configurations in the processing head 21 are the same as those of the laser processing machine 1J. The basic operation and effect of the laser processing machine 1K are the same as those of the laser processing machine 1J.

Twelfth Embodiment

Figure 24:
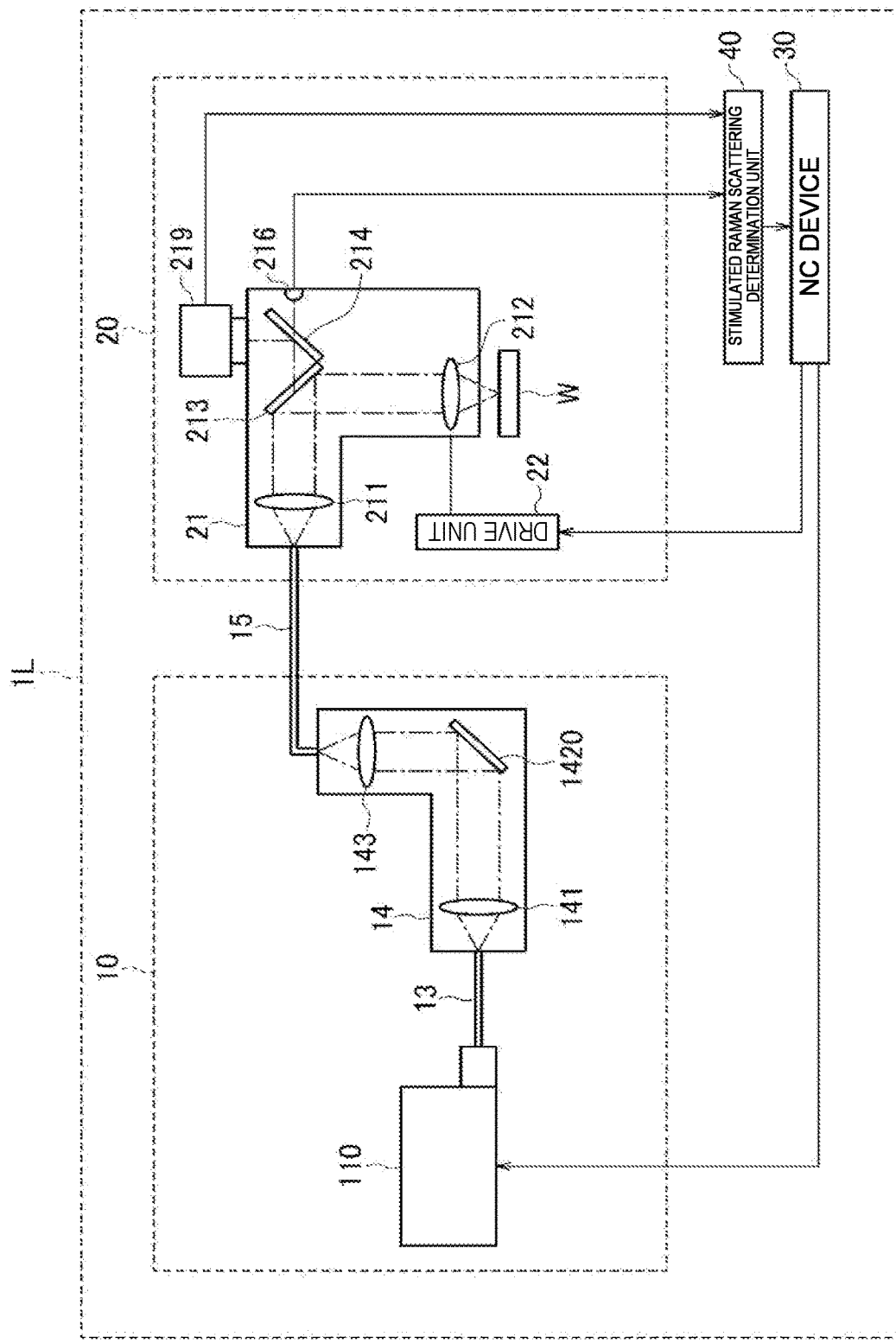
FIG. 24 is a configuration diagram showing a laser processing machine of a twelfth embodiment.

A laser processing machine 1L according to a twelfth embodiment shown in FIG. 24 will be described. As shown in FIG. 24, the laser processing machine 1L includes a second image pickup element 219 as a second detector that receives the second beam amount of the laser beam having the first frequency band reflected by the dichroic mirror 214 in the processing head 21. The second image pickup element 219 is, for example, a CCD. Hereinafter, the second image pickup element 219 will be referred to as the second CCD 219. Other configurations in the processing head 21 are the same as those of the laser processing machine 1J. The basic operation and effect of the laser processing machine 1L are the same as those of the laser processing machine 1J.

Thirteenth Embodiment

Figure 25:
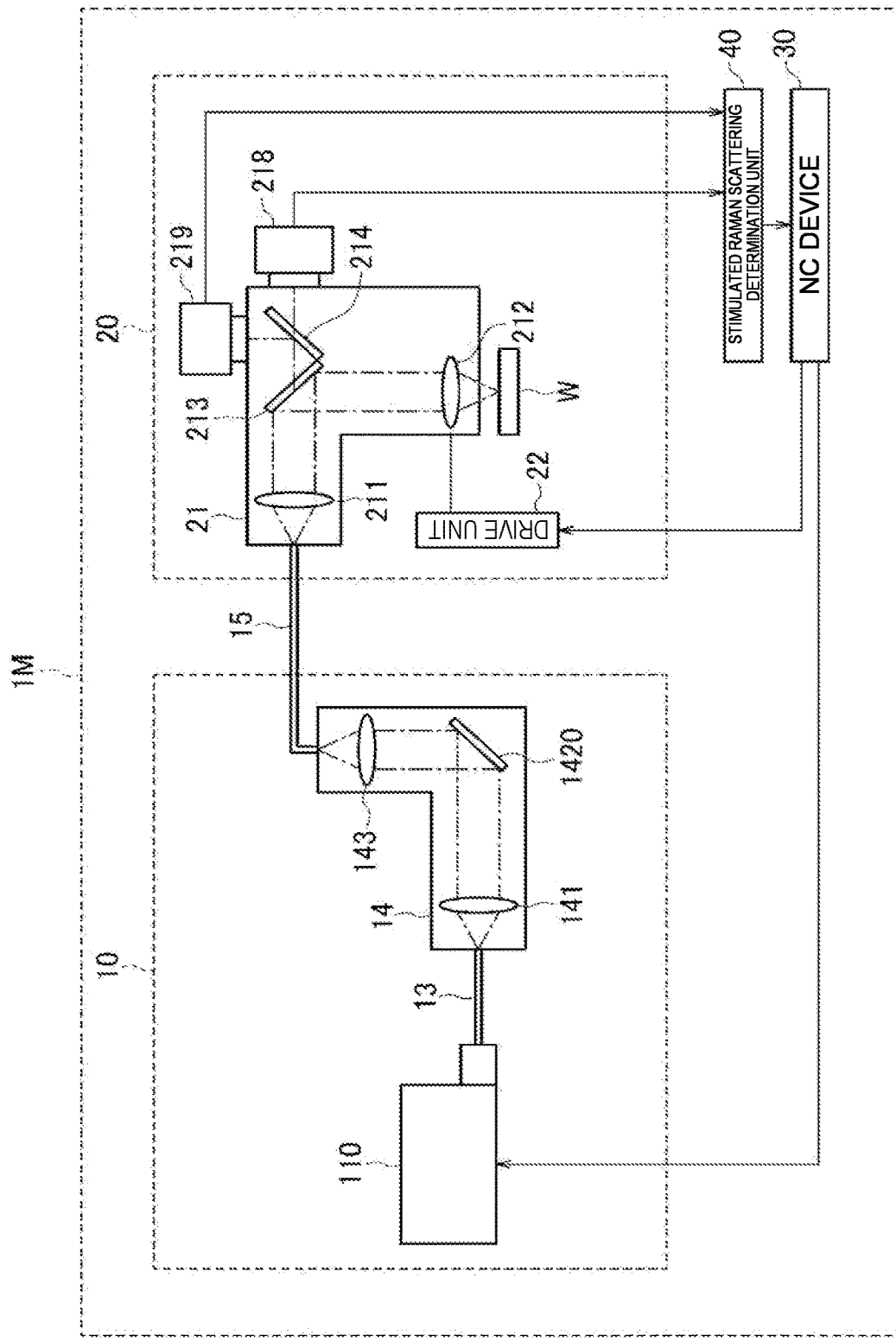
FIG. 25 is a configuration diagram showing a laser processing machine of a thirteenth embodiment.

A laser processing machine 1M according to a thirteenth embodiment shown in FIG. 25 will be described. As shown in FIG. 25, the laser processing machine 1M includes the first CCD 218 as a first detector that receives the first beam amount of the laser beam having the second frequency band transmitted through the dichroic mirror 214 in the processing head 21. Further, the laser processing machine 1M includes the second CCD 219 as a second detector that receives the second beam amount of the laser beam having the first frequency band reflected by the dichroic mirror 214 in the processing head 21. Other configurations in the processing head 21 are the same as those in the tenth embodiment. The basic operation and effect of the laser processing machine 1M are the same as those of the laser processing machine 1J.

Fourteenth Embodiment

Figure 26:
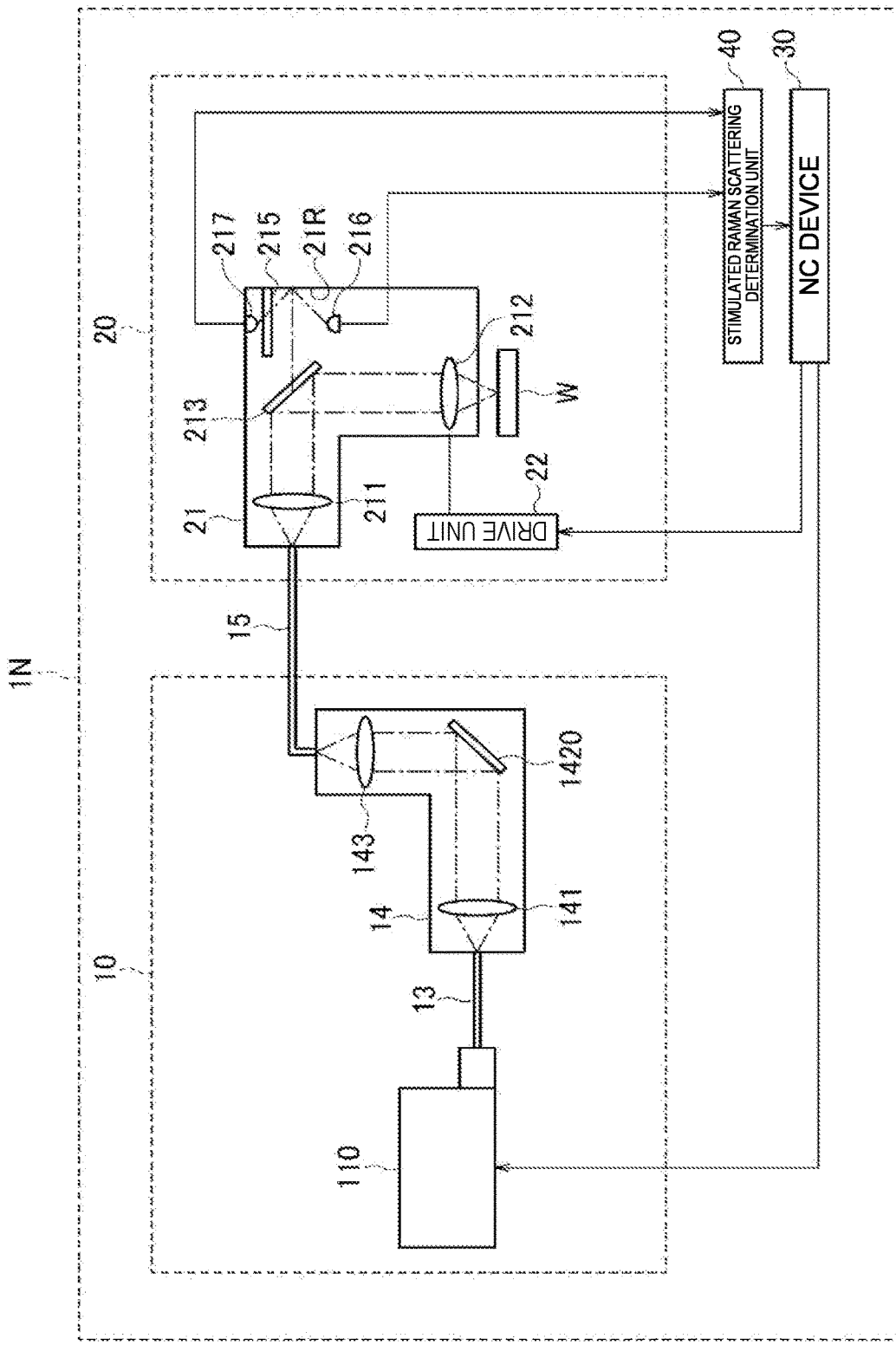
FIG. 26 is a configuration diagram showing a laser processing machine of a fourteenth embodiment.

A laser processing machine 1N according to a fourteenth embodiment shown in FIG. 26 will be described. As shown in FIG. 26, in the laser processing machine 1N, the laser beam transmitted through the bend mirror 213 in the processing head 21 is reflected by a reflecting surface 21R provided on an inner wall of the processing head 21 and is made incident on the first photodiode 216. The first photodiode 216 receives the third beam amount of the reflected laser beam. In other words, the first photodiode 216 receives the third beam amount of the laser beams having the first and second frequency bands. The third beam amount received by the first photodiode 216 corresponds to the total beam amount.

Further, the laser beam transmitted through the bend mirror 213 in the processing head 21 is reflected by the reflecting surface 21R and is made incident on the second photodiode 217 via a bandpass filter 215. The bandpass filter 215 transmits, of the frequency bands that are made incident, the first frequency band having a wavelength of 1100 nm or more. Therefore, the second photodiode 217 receives the second beam amount of the laser beam that does not include the second frequency band but includes the first frequency band.

According to the fourteenth embodiment, the same effect as that of the sixth embodiment is obtained. The basic operation and effect of the laser processing machine 1N are the same as those of the laser processing machine 1J.

Fifteenth Embodiment

Figure 27:
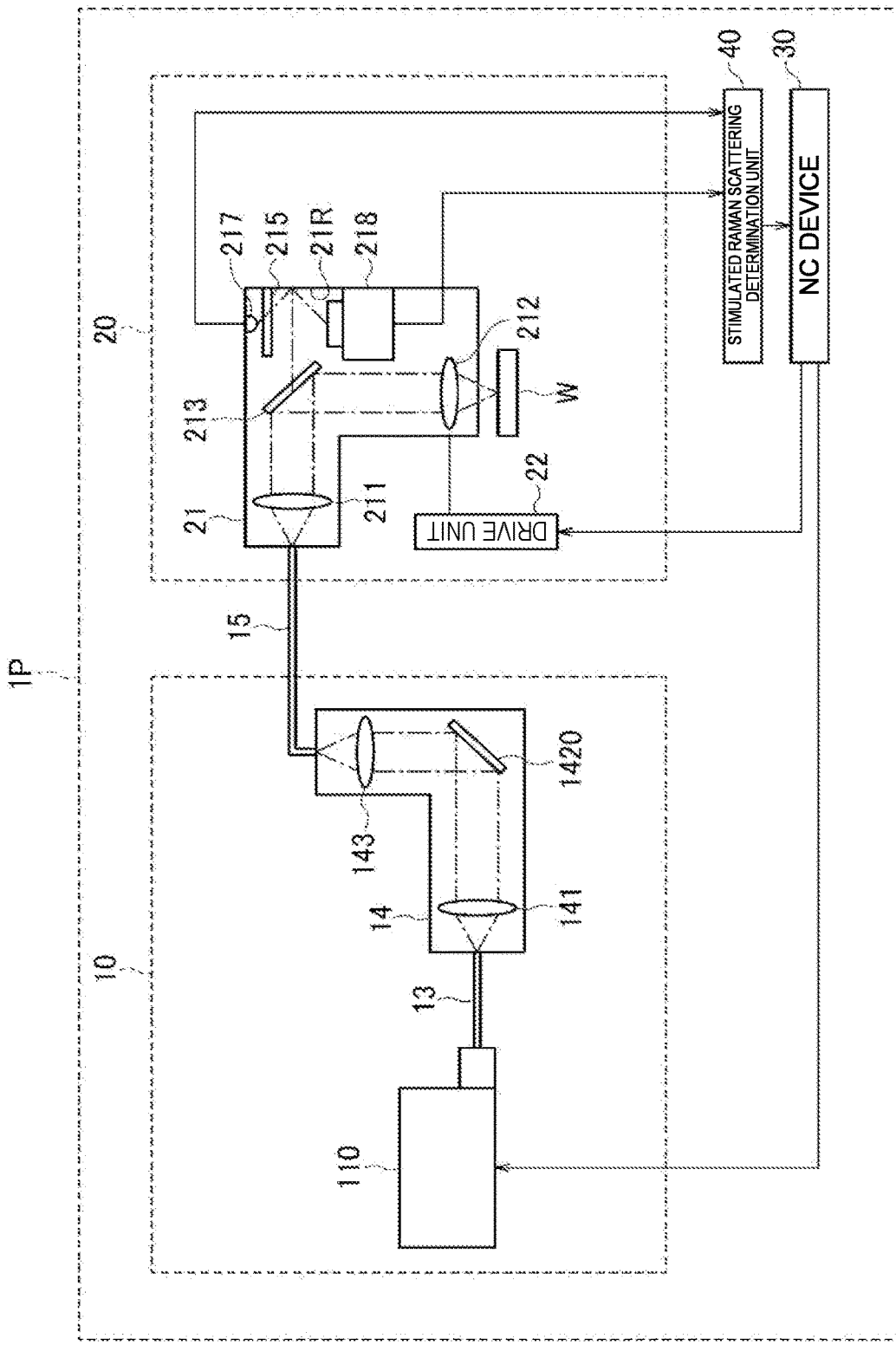
FIG. 27 is a configuration diagram showing a laser processing machine of a fifteenth embodiment.

A laser processing machine 1P according to a fifteenth embodiment shown in FIG. 27 will be described. As shown in FIG. 27, the laser processing machine 1P includes the first CCD 218 as a first detector that receives the third beam amount of the laser beam transmitted through the bend mirror 213 in the processing head 21 and reflected by the reflecting surface 21R provided on the inner wall thereof. The third beam amount received by the first CCD 218 corresponds to the total beam amount. Other configurations in the processing head 21 are the same as those in the fourteenth embodiment. The basic operation and effect of the laser processing machine 1P are the same as those of the laser processing machine 1N.

Sixteenth Embodiment

Figure 28:
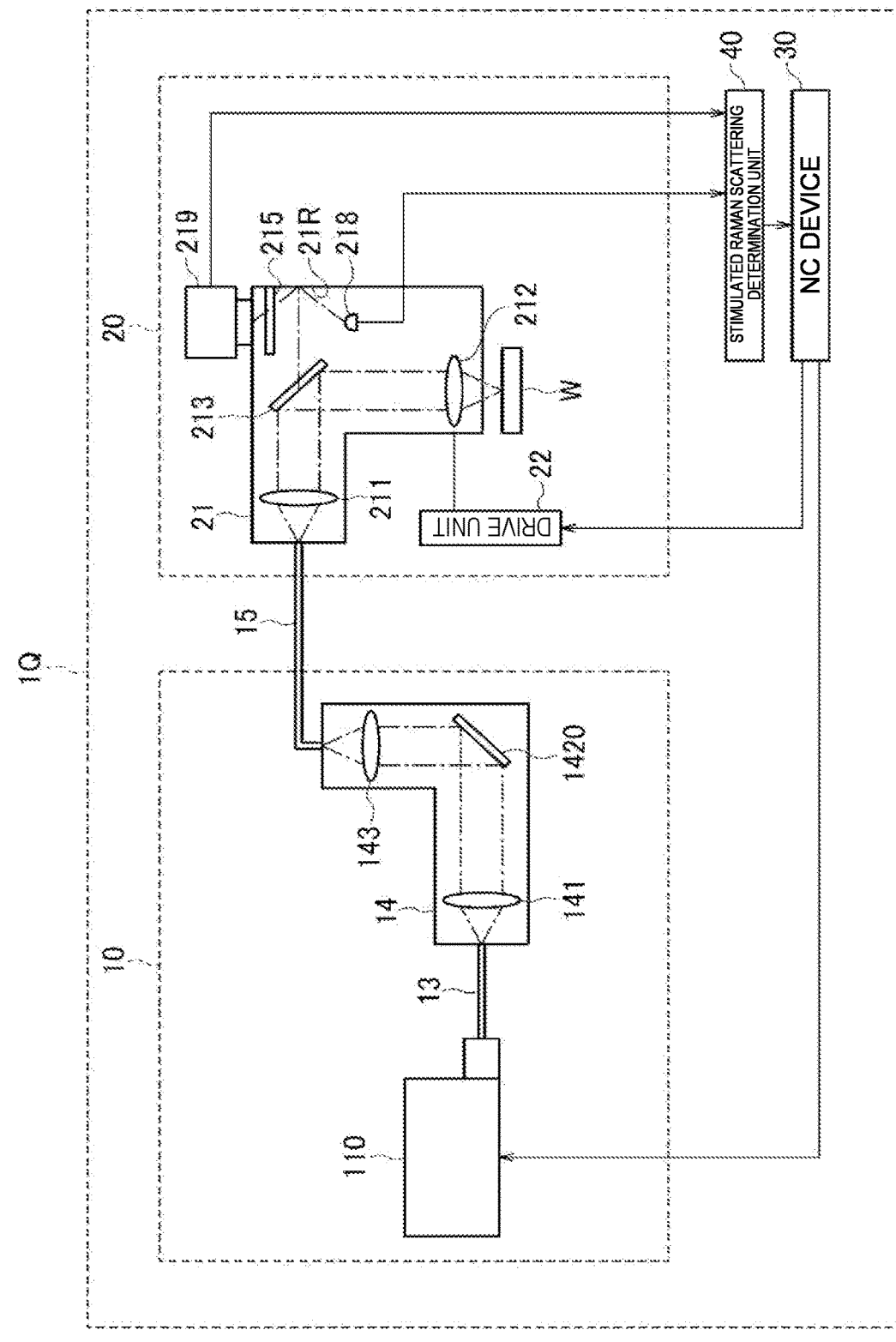
FIG. 28 is a configuration diagram showing a laser processing machine of a sixteenth embodiment.

A laser processing machine 1Q according to a sixteenth embodiment shown in FIG. 28 will be described. As shown in FIG. 28, the laser processing machine 1Q includes the second CCD 219 as a second detector that receives the second beam amount of the laser beam in which the first frequency band has been transmitted by the bandpass filter 215. Other configurations in the processing head 21 are the same as those of the laser processing machine 1N. The basic operation and effect of the laser processing machine 1Q are the same as those of the laser processing machine 1N.

Seventeenth Embodiment

Figure 29:
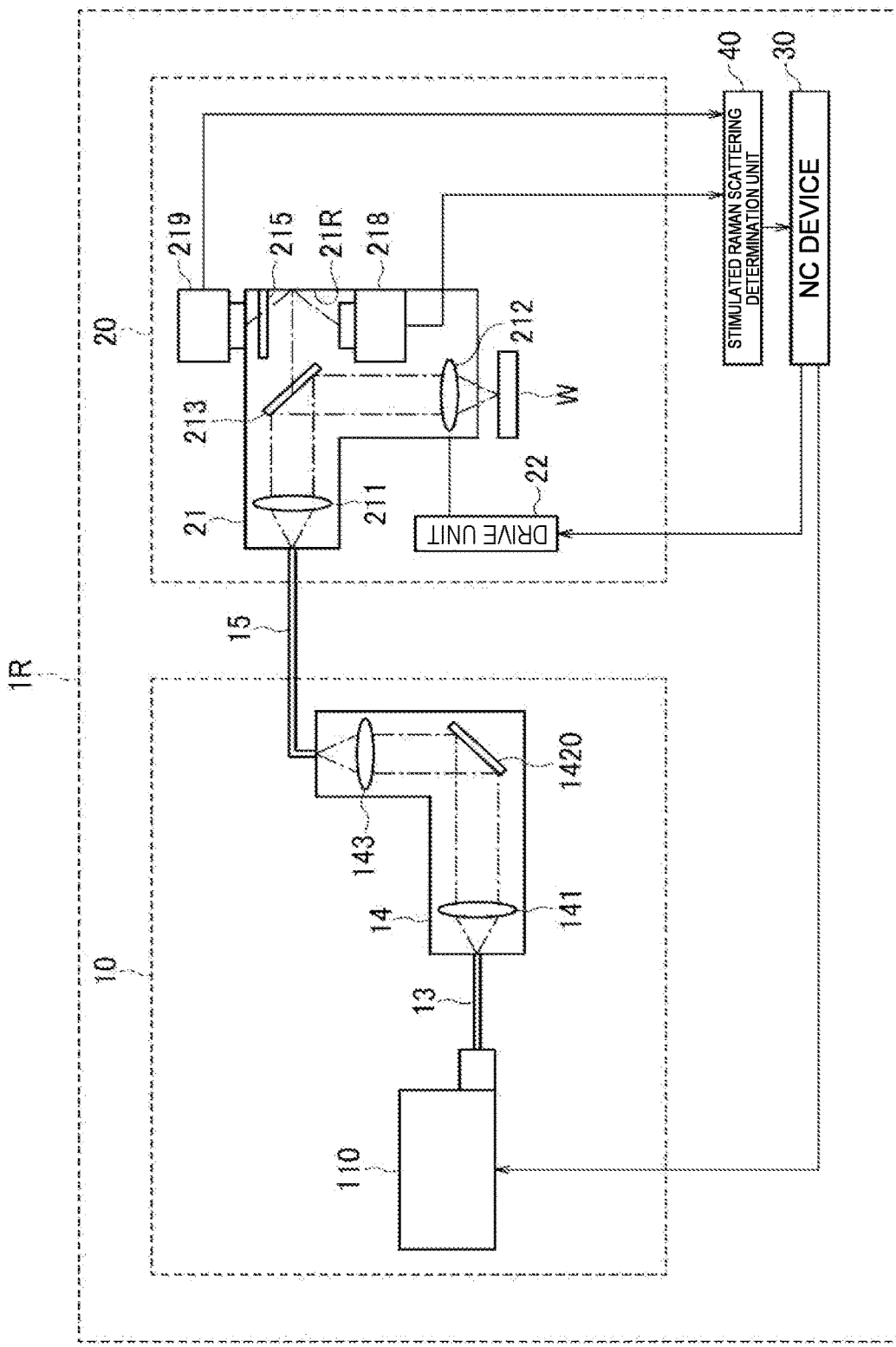
FIG. 29 is a configuration diagram showing a laser processing machine of a seventeenth embodiment.

A laser processing machine 1R according to a seventeenth embodiment shown in FIG. 29 will be described. As shown in FIG. 29, the laser processing machine 1R includes the first CCD 218 as a first detector that receives the third beam amount of the laser beam transmitted through the bend mirror 213 in the processing head 21 and reflected by the reflecting surface 21R provided on the inner wall thereof. Further, the laser processing machine 1R includes the second CCD 219 as a second detector that receives the second beam amount of the laser beam in which the first frequency band has been transmitted by the bandpass filter 215. The basic operation and effect of the laser processing machine 1R are the same as those of the laser processing machine 1N.

The second to seventeenth embodiments described above disclose the following laser processing machine and laser processing method.

(First Configuration of Laser Processing Machine)

A laser processing machine including a laser oscillator configured to emit a laser beam, a processing head configured to process a sheet metal by using the laser beam emitted from the laser oscillator, a drive unit configured to move the processing head relative to the sheet metal, a first detector configured to detect a first beam amount of a laser beam having a second frequency band lower than a first frequency band that includes an unnecessary beam due to stimulated Raman scattering or a total beam amount of laser beams having the first and the second frequency bands, from among the laser beams traveling in the laser oscillator or the processing head, a second detector configured to detect a second beam amount of a laser beam not having the second frequency band but having the first frequency band, from among the laser beams traveling in the laser oscillator or the processing head, a stimulated Raman scattering determination unit configured to output a status signal when a ratio of the second beam amount to a total beam amount in which the first beam amount and the second beam amount are added or the total beam amount detected by the first detector is greater than a predetermined threshold value or when a ratio of the second beam amount to the first beam amount is greater than the predetermined threshold value, and a control device configured to control the drive unit so as to reduce a processing velocity at which the processing head is moved relative to the sheet metal by providing a power command value to the laser oscillator so as to lower a laser power of the laser oscillator, when the status signal that is output from the stimulated Raman scattering determination unit is received.

(Second Configuration of Laser Processing Machine)

A laser processing machine including a laser oscillator configured to emit a laser beam of a pulse wave, a processing head configured to process a sheet metal by using the laser beam emitted from the laser oscillator, a drive unit configured to move the processing head relative to the sheet metal, a first detector configured to detect a first beam amount of a laser beam having a second frequency band lower than a first frequency band that includes an unnecessary beam due to stimulated Raman scattering or a total beam amount of laser beams having the first and second frequency bands, from among the laser beams traveling in the laser oscillator or the processing head, a second detector configured to detect a second beam amount of a laser beam not having the second frequency band but having the first frequency band, from among the laser beams traveling in the laser oscillator or the processing head, a stimulated Raman scattering determination unit configured to output a status signal when a ratio of the second beam amount to a total beam amount in which the first beam amount and the second beam amount are added or the total beam amount detected by the first detector is greater than a predetermined threshold value, or when a ratio of the second beam amount to the first beam amount is greater than the predetermined threshold value, and a control device configured to control the laser oscillator so as to change a pulse frequency of the laser beam emitted by the laser oscillator, when the status signal that is output from the stimulated Raman scattering determination unit is received.

(Preferred Configuration in First or Second Configuration of Laser Processing Machine)

In the first or second configuration described above, the laser oscillator or the processing head includes a bend mirror that reflects the laser beam, and a dichroic mirror that transmits the second frequency band from among the laser beams that are transmitted through the bend mirror.

(Preferred Configuration in First or Second Configuration of Laser Processing Machine)

In the first or second configuration described above, the laser oscillator or the processing head includes a bend mirror that reflects the laser beam, and a band pass filter that transmits the first frequency band from among the laser beams that are transmitted through the bend mirror.

(Preferred Configuration in First to Fourth Configurations of Laser Processing Machine)

In the first to fourth configurations described above, the first detector is a first photodiode or a first image pickup element.

(Preferred Configuration in First to Fifth Configurations of Laser Processing Machine)

In the first to fifth configurations described above, the second detector is a second photodiode or a second image pickup element.

(First Configuration of Laser Processing Method)

A laser processing method including detecting, by a first detector, a first beam amount of a second frequency band lower than a first frequency band that includes an unnecessary beam due to stimulated Raman scattering or a total beam amount of laser beams including the first and second frequency bands, from among laser beams transmitting through a bend mirror provided to a beam coupler or a processing head in a laser oscillator that emits the laser beam, detecting, by a second detector, a second beam amount of a laser beam not including the second frequency band but including the first frequency band, from among the laser beams transmitting through the bend mirror, generating a status signal when a ratio of the second beam amount to a total beam amount in which the first beam amount and the second beam amount are added or the total beam amount detected by the first detector is greater than a predetermined threshold value or when a ratio of the second beam amount to first beam amount is greater than the predetermined threshold value, and reducing a processing velocity at which the processing head is moved relative to a sheet metal to be processed by providing a power command value to the laser oscillator so as to lower a laser power of the laser oscillator, when the status signal is generated.

(Second Configuration of Laser Processing Method)

A laser processing method including detecting, by a first detector, a first beam amount of a second frequency band lower than a first frequency band that includes an unnecessary beam due to stimulated Raman scattering or a total beam amount of laser beams including the first and second frequency bands, from among laser beams transmitting through a bend mirror provided to a beam coupler or a processing head in a laser oscillator that emits the laser beam of a pulse wave, detecting, by a second detector, a second beam amount of a laser beam not including the second frequency band but including the first frequency band, from among the laser beams transmitting through the bend mirror, generating a status signal when a ratio of the second beam amount to a total beam amount in which the first beam amount and the second beam amount are added or the total beam amount detected by the first detector is greater than a predetermined threshold value, or when a ratio of the second beam amount to the first beam amount is greater than the predetermined threshold value, and changing a pulse frequency of the laser beam emitted by the laser oscillator when the status signal is generated.

The present invention is not limited to the first to seventeenth embodiments described above, and various modifications can be made without departing from the summary of the present invention.

The present application claims priority based on Japanese Patent Application No. 2020-134769 filed with the Japan Patent Office on Aug. 7, 2020, and Japanese Patent Application No. 2020-167465 filed with the Japan Patent Office on Oct. 2, 2020, and all disclosures thereof are incorporated herein by reference.

The invention claimed is:

1. A laser oscillator, comprising:
a pulse generation unit configured to generate, based on a power command signal, a driving voltage signal, the driving voltage signal comprising a pulse signal that alternately repeats a high with a maximum voltage value and a low with a minimum voltage value, the power command signal comprising a pulse signal that alternately repeats a high with a maximum voltage command value and a low with a minimum voltage command value; and
a laser oscillation module configured to oscillate a laser beam by carrying out, based on the driving voltage signal, a pulse oscillating operation, wherein
the pulse generation unit is configured
to superimpose a sub pulse on the driving voltage signal, when the power command signal has a voltage command value corresponding to a laser power greater than a predetermined laser power during a high period with the maximum voltage command value, by modulating, in a pulsed manner, a voltage value of a high period with the maximum voltage value of the driving voltage signal so as to alternately repeat a high state and a low state for a preset period of time from a rising time of the high period of the driving voltage signal, the preset period of time being equal to or shorter than the high period of the driving voltage signal, the voltage value being maintained in the high state, the voltage value being lowered by a predetermined voltage value in the low state without being lowered to a voltage value of a low period with the minimum voltage value of the driving voltage signal, and
not to superimpose the sub pulse on the driving voltage signal, when the power command signal has a voltage command value corresponding to a laser power equal to or less than the predetermined laser power during the high period with the maximum voltage command value, without modulating, in a pulsed manner, the voltage value of the high period with the maximum voltage value of the driving voltage signal.

2. The laser oscillator according to claim 1, wherein the pulse generation unit is configured to modulate the voltage value of the high period of the driving voltage signal such that a voltage value of a low period with the low state of the sub pulse is a voltage value corresponding to the voltage command value corresponding to the predetermined laser power.

3. The laser oscillator according to claim 1, wherein the pulse generation unit is configured
to superimpose the sub pulse for the preset period of time from the rising time of the high period of the driving volage signal when the high period of the driving voltage signal is longer than the preset period of time, and not to superimpose the sub pulse during a period exceeding the preset period of time of the high period of the driving voltage signal, and
to superimpose the sub pulse during an entire high period of the driving voltage signal when the high period of the driving voltage signal is equal to or less than the preset period of time.

4. A laser processing machine, comprising:
a control device configured to generate a power command signal comprising a pulse signal that alternately repeats a high with a maximum voltage command value and a low with a minimum voltage command value;
a laser oscillator configured to oscillate a laser beam by carrying out, based on the power command signal, a pulse oscillating operation, and to emit the laser beam; and
a processing unit configured to process a sheet metal by using the laser beam emitted by the laser oscillator, wherein
the laser oscillator includes:
a pulse generation unit configured to generate, based on the power command signal, a driving voltage signal comprising a pulse signal that alternately repeats a high with a maximum voltage value and a low with a maximum voltage value, and
a laser oscillation module configured to oscillate the laser beam by carrying out, based on the driving voltage signal, the pulse oscillating operation, and
the pulse generation unit is configured
to superimpose a sub pulse on the driving voltage signal, when the power command signal has a voltage command value corresponding to a laser power greater than a predetermined laser power during a high period with the maximum voltage command value, by modulating, in a pulsed manner, a voltage value of a high period with the maximum voltage value of the driving voltage signal so as to alternately repeat a high state and a low state for a preset period of time from a rising time of the high period of the driving voltage signal, the preset period of time being equal to or shorter than the high period of the driving voltage signal, the voltage value being maintained in the high state, the voltage value being lowered by a predetermined voltage value in the low state without being lowered to a voltage value of a low period with the minimum voltage value of the driving voltage signal, and not to superimpose the sub pulse on the driving voltage signal, when the power command signal has a voltage command value corresponding to a laser power equal to or less than the predetermined laser power during the high period with the maximum voltage command value, without modulating, in a pulsed manner, the voltage value of the high period with the maximum voltage value of the driving voltage signal.

5. A method of suppressing stimulated Raman scattering, comprising:

generating, by a control device, a power command signal to cause a laser oscillator to emit a laser beam and setting a voltage command value of a high period in accordance with a laser power of the laser beam emitted by the laser oscillator, the power command signal comprising a pulse signal that alternately repeats a high with a maximum voltage command value and a low with a minimum voltage command value, the high period being with the maximum voltage command value;

generating, by a pulse generation unit provided to the laser oscillator and based on the power command signal supplied from the control device, a driving voltage signal comprising a pulse signal that alternately repeats a high with a maximum voltage value and a low with a maximum voltage value;

oscillating, by a laser oscillation module provided to the laser oscillator, the laser beam by carrying out, based on the driving voltage signal, a pulse oscillating operation; and superimposing a sub pulse on the driving voltage signal, when the power command signal has a voltage command value corresponding to a laser power at which the stimulated Raman scattering is generated during a high period with the maximum voltage command value, by modulating, in a pulsed manner, a voltage value of a high period with the maximum voltage value of the driving voltage signal generated by the pulse generation unit so as to alternately repeat a high state and a low state for a preset period of time from a rising time of the high period of the driving voltage signal, the preset period of time being equal to or shorter than the high period of the driving voltage signal, the voltage value being maintained in the high state, the voltage value being lowered in the low state to a voltage value corresponding to a voltage command value corresponding to a laser power at which the stimulated Raman scattering is not generated.

* * * * *